(12) United States Patent
Lee et al.

(10) Patent No.: US 9,678,572 B2
(45) Date of Patent: Jun. 13, 2017

(54) APPARATUS AND METHOD FOR TURNING E-BOOK PAGES IN PORTABLE TERMINAL

(75) Inventors: Sung-Min Lee, Seoul (KR); Dal-Kwang Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 13/232,595

(22) Filed: Sep. 14, 2011

(65) Prior Publication Data

US 2012/0084704 A1    Apr. 5, 2012

(30) Foreign Application Priority Data

Oct. 1, 2010 (KR) .................. 10-2010-0095815
Jan. 28, 2011 (KR) .................. 10-2011-0008606

(51) Int. Cl.
*G06F 3/01* (2006.01)
*G06F 3/0483* (2013.01)
*G06F 3/0488* (2013.01)

(52) U.S. Cl.
CPC ............ *G06F 3/017* (2013.01); *G06F 3/0483* (2013.01); *G06F 3/04883* (2013.01)

(58) Field of Classification Search
CPC .... G06F 3/0488; G06F 17/217; G06F 1/1626; G06F 1/1694; G06F 3/0483; G06F 15/0291
See application file for complete search history.

(56) References Cited

U.S. PATENT DOCUMENTS

| 5,463,725 | A  | 10/1995 | Henckel et al. |
| 5,787,295 | A  | 7/1998 | Nakao |
| 6,300,933 | B1 | 10/2001 | Nagasaki et al. |
| 6,448,986 | B1 | 9/2002 | Smith |
| 6,741,268 | B1* | 5/2004 | Hayakawa .................... 715/777 |
| 6,765,559 | B2 | 7/2004 | Hayakawa |
| 6,788,292 | B1* | 9/2004 | Nako et al. .................... 345/173 |

(Continued)

FOREIGN PATENT DOCUMENTS

| CN | 1688962 A | 10/2005 |
| CN | 1854992 A | 11/2006 |

(Continued)

OTHER PUBLICATIONS

Office Action dated Jan. 2, 2014 in connection with U.S. Appl. No. 13/232,493, 21 pages.

(Continued)

*Primary Examiner* — Amy M Levy

(57) ABSTRACT

An apparatus and method for turning pages of an electronic-book (e-book) in a portable terminal having an e-book function. The method includes executing the e-book function, displaying a right lateral side of the e-book and receiving a inclination value from a 3-axis sensor when a touch event is detected in a right User Interface (UI) active area of the e-book, determining whether the inclination value greater than or equal to a threshold is detected in a left direction, and upon detection of the inclination value greater than or equal to the threshold in the left direction, displaying a next page to a screen on a single-page basis at a speed in proportion to the inclination value detected in the process of detecting the inclination greater than or equal to the threshold in the left direction.

14 Claims, 20 Drawing Sheets

(56) References Cited

U.S. PATENT DOCUMENTS

| | | | |
|---|---|---|---|
| 6,957,233 B1 | 10/2005 | Beezer et al. | |
| 6,989,815 B2 | 1/2006 | Liang et al. | |
| 6,992,687 B1 | 1/2006 | Baird et al. | |
| 7,032,187 B2 | 4/2006 | Keely, Jr. et al. | |
| 7,069,518 B2 | 6/2006 | Card et al. | |
| 7,081,882 B2 | 7/2006 | Sowden et al. | |
| 7,185,274 B1 | 2/2007 | Rubin et al. | |
| 7,249,324 B2 | 7/2007 | Nakamura et al. | |
| 7,289,102 B2* | 10/2007 | Hinckley et al. | 345/156 |
| 7,519,468 B2* | 4/2009 | Orr et al. | 701/433 |
| 7,555,724 B2 | 6/2009 | Ho | |
| 7,574,669 B1 | 8/2009 | Braun et al. | |
| 7,714,837 B2* | 5/2010 | Hsieh | 345/156 |
| 7,760,183 B2* | 7/2010 | Grady et al. | 345/156 |
| 7,898,541 B2 | 3/2011 | Hong et al. | |
| 8,046,030 B2* | 10/2011 | Dunko | 455/567 |
| 8,228,292 B1* | 7/2012 | Ruiz et al. | 345/156 |
| 8,284,167 B2 | 10/2012 | Li et al. | |
| 8,499,251 B2 | 7/2013 | Petschnigg et al. | |
| 8,707,174 B2 | 4/2014 | Hinckley et al. | |
| 8,799,765 B1 | 8/2014 | MacInnis et al. | |
| 8,866,741 B2 | 10/2014 | Cho et al. | |
| 8,935,627 B2 | 1/2015 | Ryu et al. | |
| 9,026,932 B1 | 5/2015 | Dixon | |
| 9,223,475 B1 | 12/2015 | Kim | |
| 9,557,910 B2 | 1/2017 | Lee et al. | |
| 2001/0024195 A1 | 9/2001 | Hayakawa | |
| 2002/0011990 A1 | 1/2002 | Anwar | |
| 2002/0143489 A1* | 10/2002 | Orchard | 702/141 |
| 2002/0167481 A1* | 11/2002 | Wong et al. | 345/156 |
| 2002/0184189 A1 | 12/2002 | Hay et al. | |
| 2003/0020687 A1 | 1/2003 | Sowden et al. | |
| 2003/0048251 A1 | 3/2003 | Liang et al. | |
| 2003/0048305 A1* | 3/2003 | Liang et al. | 345/776 |
| 2003/0206189 A1 | 11/2003 | DeMello et al. | |
| 2004/0006737 A1 | 1/2004 | Colbath et al. | |
| 2004/0008970 A1 | 1/2004 | Junkersfeld et al. | |
| 2004/0039750 A1 | 2/2004 | Anderson et al. | |
| 2004/0125081 A1 | 7/2004 | Hayakawa | |
| 2004/0135770 A1* | 7/2004 | Hayasaka | 345/156 |
| 2004/0143796 A1 | 7/2004 | Lerner et al. | |
| 2004/0236774 A1 | 11/2004 | Baird et al. | |
| 2005/0005246 A1 | 1/2005 | Card et al. | |
| 2005/0108233 A1 | 5/2005 | Metsatahti et al. | |
| 2005/0184956 A1* | 8/2005 | Wong et al. | 345/156 |
| 2006/0010396 A1 | 1/2006 | Beezer et al. | |
| 2006/0026251 A1 | 2/2006 | Cheng et al. | |
| 2006/0026521 A1 | 2/2006 | Hotelling et al. | |
| 2006/0050054 A1* | 3/2006 | Liang et al. | 345/156 |
| 2006/0125803 A1 | 6/2006 | Westerman et al. | |
| 2006/0277478 A1 | 12/2006 | Seraji et al. | |
| 2007/0061755 A1 | 3/2007 | Taboada et al. | |
| 2007/0085845 A1 | 4/2007 | Kikuchi et al. | |
| 2007/0164993 A1* | 7/2007 | Kao et al. | 345/156 |
| 2007/0188450 A1 | 8/2007 | Hernandez et al. | |
| 2007/0290999 A1* | 12/2007 | Cho et al. | 345/158 |
| 2008/0036743 A1 | 2/2008 | Westerman et al. | |
| 2008/0040692 A1 | 2/2008 | Sunday et al. | |
| 2008/0074399 A1 | 3/2008 | Lee | |
| 2008/0211685 A1* | 9/2008 | Grady et al. | 340/689 |
| 2008/0222552 A1 | 9/2008 | Batarseh et al. | |
| 2008/0243828 A1 | 10/2008 | Reztlaff et al. | |
| 2008/0288887 A1* | 11/2008 | Wong et al. | 715/776 |
| 2009/0064027 A1 | 3/2009 | Navas Cadena et al. | |
| 2009/0195515 A1 | 8/2009 | Lee | |
| 2009/0237367 A1* | 9/2009 | Ryu et al. | 345/173 |
| 2009/0262074 A1* | 10/2009 | Nasiri et al. | 345/158 |
| 2009/0271703 A1 | 10/2009 | Chu et al. | |
| 2009/0271731 A1 | 10/2009 | Lin et al. | |
| 2009/0271783 A1 | 10/2009 | Hsieh et al. | |
| 2010/0045616 A1 | 2/2010 | Li et al. | |
| 2010/0060475 A1 | 3/2010 | Choi | |
| 2010/0060664 A1* | 3/2010 | Kilpatrick et al. | 345/650 |
| 2010/0088641 A1 | 4/2010 | Choi | |
| 2010/0117975 A1* | 5/2010 | Cho | 345/173 |
| 2010/0134412 A1* | 6/2010 | Narita | 345/156 |
| 2010/0164888 A1* | 7/2010 | Okumura et al. | 345/173 |
| 2010/0175018 A1 | 7/2010 | Petschnigg et al. | |
| 2010/0295790 A1* | 11/2010 | Yu | 345/168 |
| 2011/0010617 A1 | 1/2011 | Kim et al. | |
| 2011/0047460 A1 | 2/2011 | Choe | |
| 2011/0050591 A1 | 3/2011 | Kim et al. | |
| 2011/0099513 A1 | 4/2011 | Ameline | |
| 2011/0153330 A1 | 6/2011 | Yazdani et al. | |
| 2011/0163955 A1* | 7/2011 | Nasiri et al. | 345/158 |
| 2011/0167384 A1 | 7/2011 | Yabu et al. | |
| 2011/0209039 A1 | 8/2011 | Hinckley et al. | |
| 2011/0209057 A1 | 8/2011 | Hinckley et al. | |
| 2011/0210932 A1* | 9/2011 | Ryu et al. | 345/173 |
| 2011/0296334 A1 | 12/2011 | Ryu et al. | |
| 2011/0298762 A1 | 12/2011 | Lin | |
| 2011/0316888 A1* | 12/2011 | Sachs et al. | 345/667 |
| 2012/0017167 A1 | 1/2012 | Lee et al. | |
| 2012/0047470 A1 | 2/2012 | Martinoli | |
| 2012/0066581 A1 | 3/2012 | Spalink | |
| 2012/0066591 A1 | 3/2012 | Hackwell | |
| 2012/0075327 A1 | 3/2012 | Mackenzie | |
| 2012/0089938 A1 | 4/2012 | Homma et al. | |
| 2012/0105464 A1* | 5/2012 | Franceus | 345/581 |
| 2012/0124505 A1* | 5/2012 | St. Jacques, Jr. | 715/776 |
| 2012/0127109 A1 | 5/2012 | Nishio et al. | |
| 2012/0154293 A1* | 6/2012 | Hinckley et al. | 345/173 |
| 2012/0154294 A1* | 6/2012 | Hinckley et al. | 345/173 |
| 2012/0159373 A1 | 6/2012 | Archer et al. | |
| 2012/0188154 A1 | 7/2012 | Lee | |
| 2012/0311438 A1* | 12/2012 | Cranfill et al. | 715/256 |
| 2013/0219321 A1 | 8/2013 | Cranfill et al. | |
| 2013/0298067 A1 | 11/2013 | Parker et al. | |

FOREIGN PATENT DOCUMENTS

| | | |
|---|---|---|
| CN | 101082837 A | 12/2007 |
| CN | 101582007 A | 11/2009 |
| CN | 101655766 A | 2/2010 |
| CN | 201491069 U | 5/2010 |
| CN | 101794191 | 8/2010 |
| CN | 201576359 U | 9/2010 |
| EP | 2000894 A2 | 12/2008 |
| EP | 2104026 A2 | 9/2009 |
| JP | H 06-231186 A | 8/1994 |
| JP | H 10-161619 A | 6/1998 |
| JP | H 10161619 A | 6/1998 |
| JP | 2000-123044 A | 4/2000 |
| JP | 2000-163193 A | 6/2000 |
| JP | 2000-242390 A | 9/2000 |
| JP | 2002-82878 A | 3/2002 |
| JP | 2002140159 A | 5/2002 |
| JP | 2002341991 A | 11/2002 |
| JP | 2003-140802 A | 5/2003 |
| JP | 2003157134 A | 5/2003 |
| JP | 2004-288208 A | 10/2004 |
| JP | 2004-355106 A | 12/2004 |
| JP | 2005165760 A | 6/2005 |
| JP | 2006-53605 A | 2/2006 |
| JP | 2007310888 A | 11/2007 |
| JP | 2010-170573 A | 8/2010 |
| JP | 2013-521547 A | 6/2013 |
| KR | 20070039613 | 4/2007 |
| KR | 20090101035 | 9/2009 |
| KR | 20100033242 | 3/2010 |
| WO | 2006020305 A2 | 2/2006 |
| WO | 2009097592 A1 | 8/2009 |
| WO | WO 2009/099268 A1 | 8/2009 |
| WO | 2009128593 A1 | 10/2009 |
| WO | WO 2010041826 A2 | 4/2010 |
| WO | WO 2010080258 A2 | 7/2010 |

OTHER PUBLICATIONS

Office Action dated Aug. 12, 2014 in connection with U.S. Appl. No. 13/232,812, 33 pages.

Office Action dated Jun. 3, 2014 in connection with U.S. Appl. No. 13/232,431, 24 pages.

(56) References Cited

OTHER PUBLICATIONS

Office Action dated Jun. 3, 2014 in connection with U.S. Appl. No. 13/232,493, 19 pages.
Cancel dictionary definition. Retrieved from [http://dictionary.references.com/brows/cancel] on Jul. 24, 2014, 4 pages.
Office Action dated Nov. 15, 2013 in connection with U.S. Appl. No. 13/232,431, 18 pages.
Office Action dated Mar. 26, 2014 in connection with U.S. Appl. No. 13/232,812, 18 pages.
Non-Final Office Action dated Mar. 20, 2015 in connection with U.S. Appl. No. 13/232,431; 20 pages.
Non-Final Office Action dated Mar. 31, 2015 in connection with U.S. Appl. No. 13/232,493; 21 pages.
Non-Final Office Action dated Jan. 28, 2015 in connection with U.S. Appl. No. 13/232,812; 20 pages.
Non-Final Office Action dated Nov. 28, 2014 in connection with U.S. Appl. No. 13/232,431; 15 pages.
Non-Final Office Action dated Dec. 2, 2014 in connection with U.S. Appl. No. 13/232,493; 21 pages.
First Office Action dated Jul. 27, 2015 in connection with Chinese Patent Application No. 201110306721.1; 21 pages.
First Office Action dated Aug. 6, 2015 in connection with Chinese Patent Application No. 201110295196.8; 30 pages.
Notice of Patent Grant dated Jun. 9, 2015 in connection with Japanese Patent Application No. 2011-217512; 5 pages.
Notice of Preliminary Rejection dated Jun. 9, 2015 in connection with Japanese Patent Application No. 2011-210134; 9 pages.
Examiner-Initated Interview Summary and Final Office Action dated Jul. 20, 2015 in connection with U.S. Appl. No. 13/232,812; 17 pages.
Yamaki, H.; "Adobe Acrobat 6.0 PDF Technical Manual"; Windows Acrobat 6.0 Portable Document Format; Nov. 10, 2003; 3 pages.
First Office Action dated Sep. 2, 2015 in connection with Chinese Patent Application No. 201110307804.2; 51 pages.
Details of First Office Action dated Sep. 15, 2015 in connection with Chinese Patent Application No. 201110303438.3; 29 pages.
Notice of Patent Grant dated Oct. 27, 2015 in connection with Japanese Patent Application No. 2011-210134; 5 pages.
Notice of Patent Grant dated Oct. 27, 2015 in connection with Japanese Patent Application No. 2011-211935; 5 pages.
Notice of Preliminary Rejection dated Oct. 27, 2015 in connection with Japanese Patent Application No. 2011-217625; 9 pages.
Non-Final Office Action dated Oct. 30, 2015 in connection with U.S. Appl. No. 13/232,431; 19 pages.
Non-Final Office Action dated Nov. 12, 2015 in connection with U.S. Appl. No. 13/232,493; 24 pages.
Non-Final Office Action dated Feb. 5, 2016 in connection with U.S. Appl. No. 13/232,812; 12 pages.
U.S. Office Action dated Jun. 17, 2016 in connection with U.S. Appl. No. 13/232,431, 14 pages.
Chinese Office Action dated May 16, 2016 in connection with Chinese Application No. 201110307804.2, 31 pages.
Chinese Office Action dated Apr. 19, 2016 in connection with Chinese Application No. 201110295196.8, 38 pages.
Chinese Office Action dated May 20, 2016 in connection with Chinese Application No. 201110303438.3, 15 pages.
U.S. Office Action dated Jun. 8, 2016 in connection with U.S. Appl. No. 13/232,812, 16 pages.
Third Office Action dated Nov. 7, 2016 in connection with Chinese Application No. 201110307804.2, 33 pages.
Notice of Preliminary Rejection dated Dec. 17, 2016 in connection with Korean Application No. 10-2011-0008606, 24 pages.
Notice of Patent Grant dated Aug. 9, 2015 in connection with Japanese Application No. 2011-217625, 5 pages.
Extended European Search Report dated Sep. 5, 2016 in connection with European Application No. 11180098.3, 12 pages.
Extended European Search Report dated Sep. 5, 2016 in connection with European Application No. 11180099.1, 11 pages.
Extended European Search Report dated Sep. 5, 2016 in connection with European Application No. 11183429.7, 12 pages.
Third Office Action dated Oct. 18, 2016 in connection with Chinese Application No. 201110295196.8, 40 pages.
Notice of Preliminary Rejection dated Sep. 23, 2016 in connection with Korean Application No. 10-2010-0136624, 8 pages.
U.S. Office Action dated Aug. 31, 2016 in connection with U.S. Appl. No. 13/232,431, 13 pages.
Foreign Communication From a Related Counterpart Application, Chinese Application No. 201110306721.1, the Fourth Office Action dated Feb. 4, 2017, 18 pages.
Foreign Communication From a Related Counterpart Application, Chinese Application No. 201110307804.2, Decision of Rejection dated Mar. 10, 2017, 33 pages.
Foreign Communication From a Related Counterpart Application, European Application No. 11180097.5-1507, Extended European Search Report dated Feb. 2, 2017, 8 pages.
Foreign Communication From a Related Counterpart Application, Korean Application No. 10-2010-0136624, Notice of Patent Grant dated Mar. 29, 2017, 3 pages.
U.S. Appl. No. 13/232,431 filed Sep. 14, 2011, Final Office Action dated Jan. 30, 2017, 18 pages.

* cited by examiner

APPARATUS AND METHOD FOR TURNING E-BOOK PAGES IN PORTABLE TERMINAL

CROSS-REFERENCE TO RELATED APPLICATION(S) AND CLAIM OF PRIORITY

The present application is related to and claims the benefit under 35 U.S.C. §119(a) of Korean patent applications filed in the Korean Intellectual Property Office on Oct. 1, 2010 and assigned Serial No. 10-2010-0095815, and on Jan. 28, 2011 and assigned Serial No. 10-2011-0008606 the entire disclosure of which is hereby incorporated by reference.

TECHNICAL FIELD OF THE INVENTION

The present invention relates to portable terminals, and more particularly, to an apparatus and method for turning pages of an electronic-book (e-book) in a portable terminal.

BACKGROUND OF THE INVENTION

The use of portable terminals is rapidly increasing due to convenience of portability, and thus service providers (or terminal vendors) are competitively developing terminals having more convenient functions to ensure more users. For example, the portable terminals provide various functions such as a phone book, a game, a scheduler, a short message, an Internet, an e-mail, an alarm, an MPEG Audio Layer-3 (MP3), a digital camera, an electronic dictionary, an electronic (e-book), etc.

The e-book for showing text contents has been introduced by using an electronic display mechanism as one of media for providing information in replacement of a conventional paper book. The e-book operates in such a manner that the text contents are stored in a flash memory or a built-in hard disk and then the stored text contents are displayed through a display screen. The e-book has an advantage in that a large volume of books are stored all together and can be read at a later time by selecting a desired part of the contents.

In this case, the contents can be displayed only in a limited area through the display screen, and thus a User Interface (UI) for providing a function of moving or scrolling a page is required to continuously show a next part of the contents. In general, a part of the text contents can be displayed on a screen while moving a page according to a page down/up function that uses a key input tool provided in the e-book. In this manner, a user can read a whole part of the text contents stored in the e-book.

SUMMARY OF THE INVENTION

To address the above-discussed deficiencies of the prior art, it is a primary object to provide at least the advantages described below. Accordingly, an aspect of the present invention is to provide an apparatus and method for turning pages of an electronic book (e-book) in a portable terminal having an e-book function.

Another aspect of the present invention is to provide an apparatus and method for turning pages of an e-book in an analog fashion in a portable terminal having an e-book function so that a user can change pages of contents in the same natural manner as turning pages of an actual paper book.

In accordance with an aspect of the present invention, a method for turning pages of an e-book in a portable terminal having an e-book function includes executing the e-book function, displaying a right lateral side of the e-book and receiving an inclination value from a 3-axis sensor when a touch event is detected in a right User Interface (UI) active area of the e-book, determining whether an inclination value greater than or equal to a threshold is detected in a left direction, and upon detection of the inclination value greater than or equal to the threshold in the left direction, displaying a next page to a screen on a single-page basis at a speed in proportion to the inclination value detected in the process of detecting the inclination greater than or equal to the threshold in the left direction.

In accordance with another aspect of the present invention, a method for turning pages of an e-book in a portable terminal having an e-book function includes executing the e-book function, determining whether a touch event is detected in a right UI active area of the e-book and a rightward drag and subsequent release is detected, receiving an inclination value from a 3-axis sensor when the rightward drag action and subsequent release is detected, determining whether the inclination value greater than or equal to a threshold is detected in a left direction, and upon detection of the inclination value greater than or equal to the threshold in the left direction, displaying a next page corresponding to a page number increased by an extent of the drag action.

In accordance with another aspect of the present invention, an apparatus includes an e-book viewer for executing an e-book function, when a touch down is input in a pre-set right UI active area of the e-book, the e-book configured to control a display unit to display a right lateral side of the e-book and receive an inclination value from a 3-axis sensor to determine whether an inclination value greater than or equal to a threshold is detected in a left direction, and upon detection of the inclination value greater than or equal to the threshold in the left direction, control the display unit to display a next page to a screen on a single-page basis at a speed in proportion to the inclination value detected in the process of detecting the inclination greater than or equal to the threshold in the left direction, the display unit configured for display a corresponding page of the e-book to the screen under the control of the e-book viewer.

In accordance with another aspect of the present invention, an apparatus includes an e-book viewer for executing an e-book function and thereafter determining whether a touch event is detected in a pre-set right UI active area of the e-book and a rightward drag action and subsequent release is detected, for receiving an inclination value from a 3-axis sensor when the rightward drag action and subsequent release is detected, for determine whether an inclination value greater than or equal to a threshold is detected in a left direction, and upon detection of the inclination value greater than or equal to the threshold in the left direction, control a display unit to display a next page corresponding to a page number increased by an extent of the drag. The display unit configured to display a corresponding page of the e-book to a screen under the control of the e-book viewer.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged e-book viewers. In the following description, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

The present invention described hereinafter relates to an apparatus and method for turning pages of an electronic book (e-book) in an analog fashion in a portable terminal having an e-book function.

A portable terminal described hereinafter includes a cellular phone having a touch panel, a Personal Communication System (PCS), a Personal Digital Assistant (PDA), an International Mobile Telecommunication-2000 (IMT2000) terminal, etc. The following description will be based on general configurations of the above examples.

Figure 1:
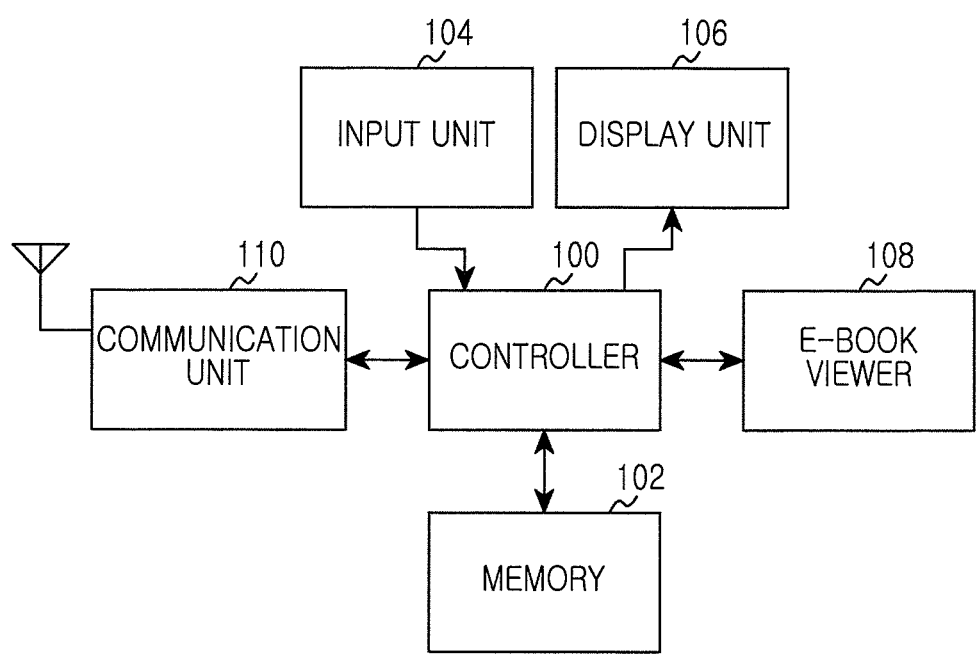
FIG. 1 illustrates and example structure of a portable terminal having an electronic-book (e-book) function according to an embodiment of the present invention.

FIG. 1 is a block diagram illustrating a structure of a portable terminal having an e-book function according to an exemplary embodiment of the present invention.

Referring to FIG. 1, the portable terminal includes a controller 100, a memory 102, an input unit 104, a display unit 106, an e-book viewer 108, and a communication unit 110.

The controller 100 provides overall control to the portable terminal. According to the present invention, the controller 100 processes a function of turning pages of an e-book in an analog fashion.

The memory 102 stores a microcode of a program for processing and control of the controller 100, a variety of reference data, temporary data that is generated while programs are performed, and a variety of rewritable data. In particular, according to the present invention, the memory 102 stores a program for turning the pages of the e-book in the analog fashion.

The input unit 104 includes numeral key buttons and a plurality of function key buttons to provide the controller 100 with key button input data corresponding to a key button pressed by the user.

The display unit 106 displays information such as state information, which is generated while the portable terminal operates, a limited number of characters, a large volume of moving and still pictures, etc. In addition to its typical function, according to the present invention, the display unit 106 is configured with a touch panel type and performs a function of the input unit 104. That is, the display unit 106 detects a touch input of the user and transmits the detected touch input to the controller 100.

The e-book viewer 108 performs a function for turning the pages of the e-book on a single-page basis or on a multi-page basis in the analog fashion so that the user can turn the page of contents naturally as if the user turns a page of an actual paper book. Further, the e-book viewer 108 supports a bookmark function for the e-book.

The communication unit 110 transmits and receives a Radio Frequency (RF) signal which is input and output through an antenna. For example, in a transmitting process, data to be transmitted is subject to a channel-coding process and a spreading process, and then the data is transformed to an RF signal. In a receiving process, the RF signal is received and transformed to a base-band signal, and the base-band signal is subject to a de-spreading process and a channel-decoding process, thereby restoring the data.

FIG. 2 illustrates an example method for turning pages of an e-book on a single-page basis in an analog fashion in a portable terminal having an e-book function according to an embodiment of the present invention. The terminal executes the e-book function and displays a pre-set page of the e-book selected by a user on a screen. In this case, a right portion of the screen includes a right UI active area 201, and a left portion of the screen includes a left UI active area 202. Herein, the right UI active area 201 and the left UI active area 202 are provided as a default by the terminal.

Figure 2A:
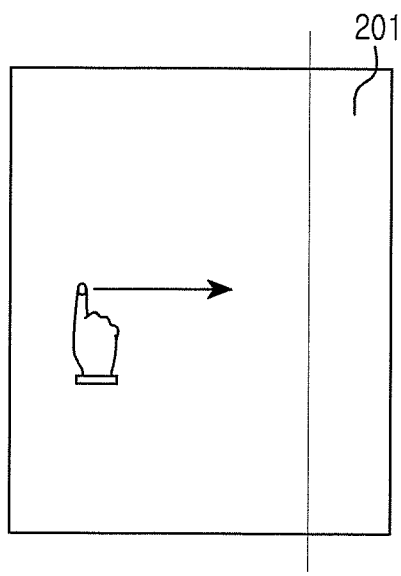
FIGS. 2A and 2B illustrate an example method for turning pages of an e-book on a single-page basis in an analog fashion in a portable terminal having an e-book function according to another embodiment of the present invention.
Figure 2B:
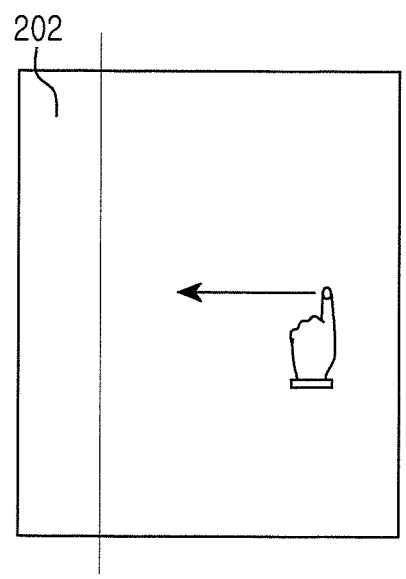

As illustrated in FIG. 2A, if a touch event is detected from the left UI active area 202 of the e-book, a rightward drag event, and subsequent release is detected, then in response, the terminal displays an previous page of the e-book on the screen. As illustrated in FIG. 2B, if a touch event is detected from the right UI active area 202 of the e-book, a leftward drag event, and subsequent release is detected, then in response, the terminal displays a next page of the e-book on the screen.

Figure 3:
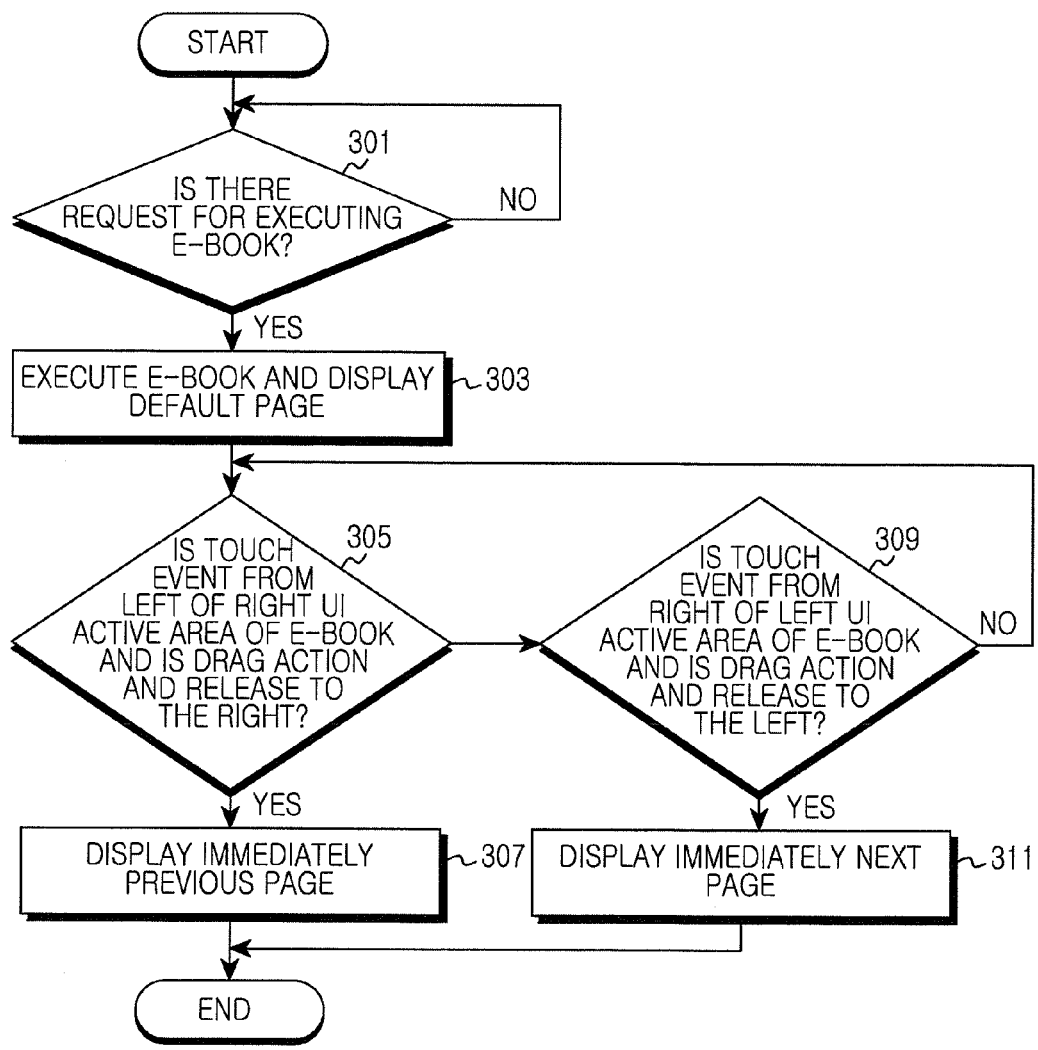
FIG. 3 illustrates a method for turning pages of an e-book on a single-page basis in an analog fashion in a portable terminal having an e-book function according to another embodiment of the present invention.

FIG. 3 illustrates an example method for turning pages of an e-book on a single-page basis in an analog fashion in a portable terminal having an e-book function according to an embodiment of the present invention. The terminal detects a request for executing the e-book function by user's key manipulation in step 301. If the request for executing the e-book function is detected in step 301, proceeding to step 303, the terminal executes the e-book function, and displays a default page of the e-book selected by the user, according to configuration information of the e-book. For example, the configuration information of the e-book may be configured in advance so that a first page of the e-book is first displayed or the most recently displayed page of the e-book is displayed when executing the e-book function.

In step 305, the terminal determines whether a touch event is detected from the left of a right UI active area of the e-book, a drag event, and subsequent release is detected. If so, the terminal displays an immediately previous page on a screen at step 307. Otherwise, proceeding to step 309, the terminal determines whether a touch event is detected from the right of a left UI active area of the e-book, a drag event, and subsequent release is detected. If so, the terminal displays a next page on the screen at step 311. Otherwise, the subsequent steps are repeated by continuing execution at step 305.

Thereafter, the procedure of FIG. 3 ends.

FIG. 4 illustrates an example method for turning pages of an e-book on a multi-page basis in an analog fashion in a portable terminal having an e-book function according to another embodiment of the present invention. The terminal executes the e-book function and displays a default page of the e-book selected by a user on a screen. In this case, a right portion of the screen defining a right UI active area 401, and a left portion of the screen defining a left UI active area 402. Herein, the right UI active area 401 and the left UI active area 402 are provided as default by the terminal.

Figure 4A:
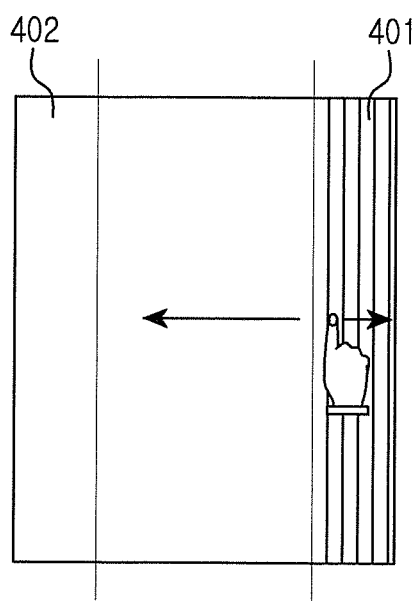
FIGS. 4A and 4B illustrate an example method for turning pages of an e-book on a multi-page basis in an analog fashion in a portable terminal having an e-book function according to another embodiment of the present invention.
Figure 4B:
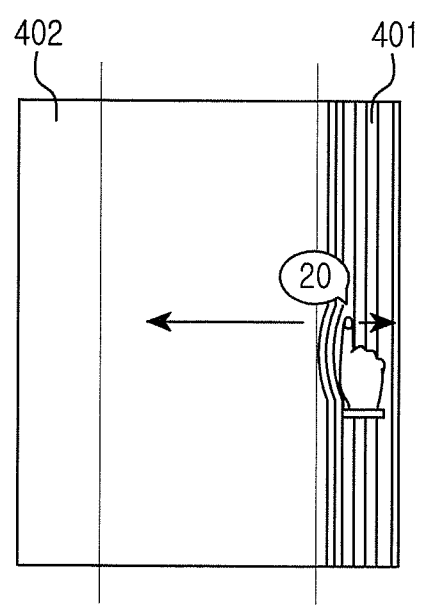

If a touch event is detected in the right UI active area 401 of the e-book, then in response, the terminal displays a right lateral side of the e-book. In this case, as illustrated in FIG. 4A, when a leftward drag event, and subsequent release is detected, then in response, the terminal displays a next page of the e-book. On the other hand, as illustrated in FIG. 4B, when a rightward drag is detected, in response, the terminal displays a page number that increases by an extent of the drag in the right lateral side of the e-book, and when the touch event is released, in response, the terminal displays another page corresponding to the increased page number.

Although not shown, if a touch event is detected in the left UI active area of the e-book, then in response, the terminal displays a left lateral side of the e-book. In this case, when a rightward drag and subsequent release is detected, the terminal displays a previous page on the screen. On the other hand, when a leftward drag is detected, in response, the terminal displays a page number decreased by an extent of the drag in the left lateral side of the e-book. Conversely, when a rightward drag and subsequent is detected, in response, the terminal displays a previous page corresponding to the decreased page number.

Figure 5A:
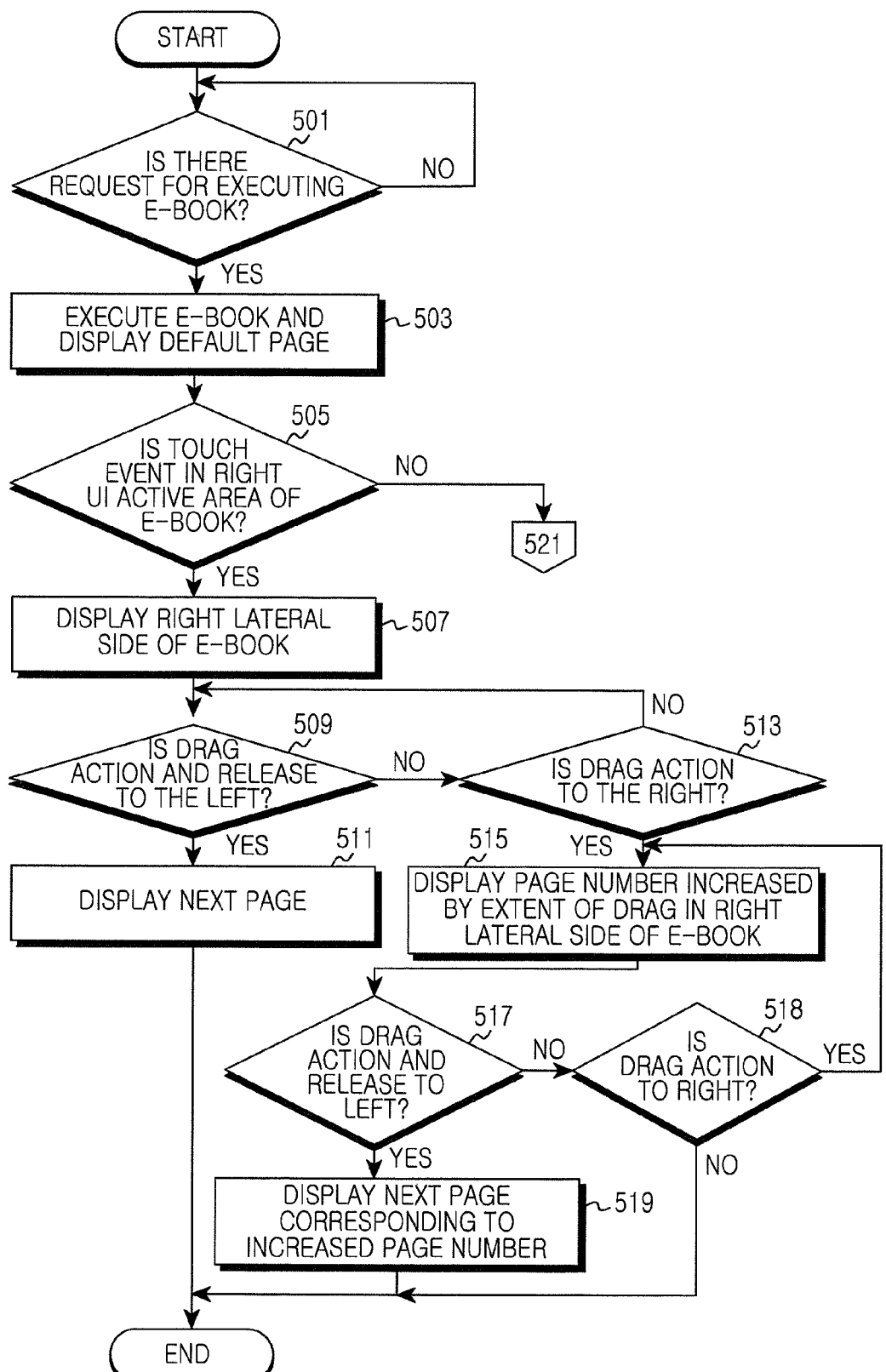
FIGS. 5A and 5B illustrate an example method for turning pages of an e-book on a multi-page basis in an analog fashion in a portable terminal having an e-book function according to another embodiment of the present invention.
Figure 5B:
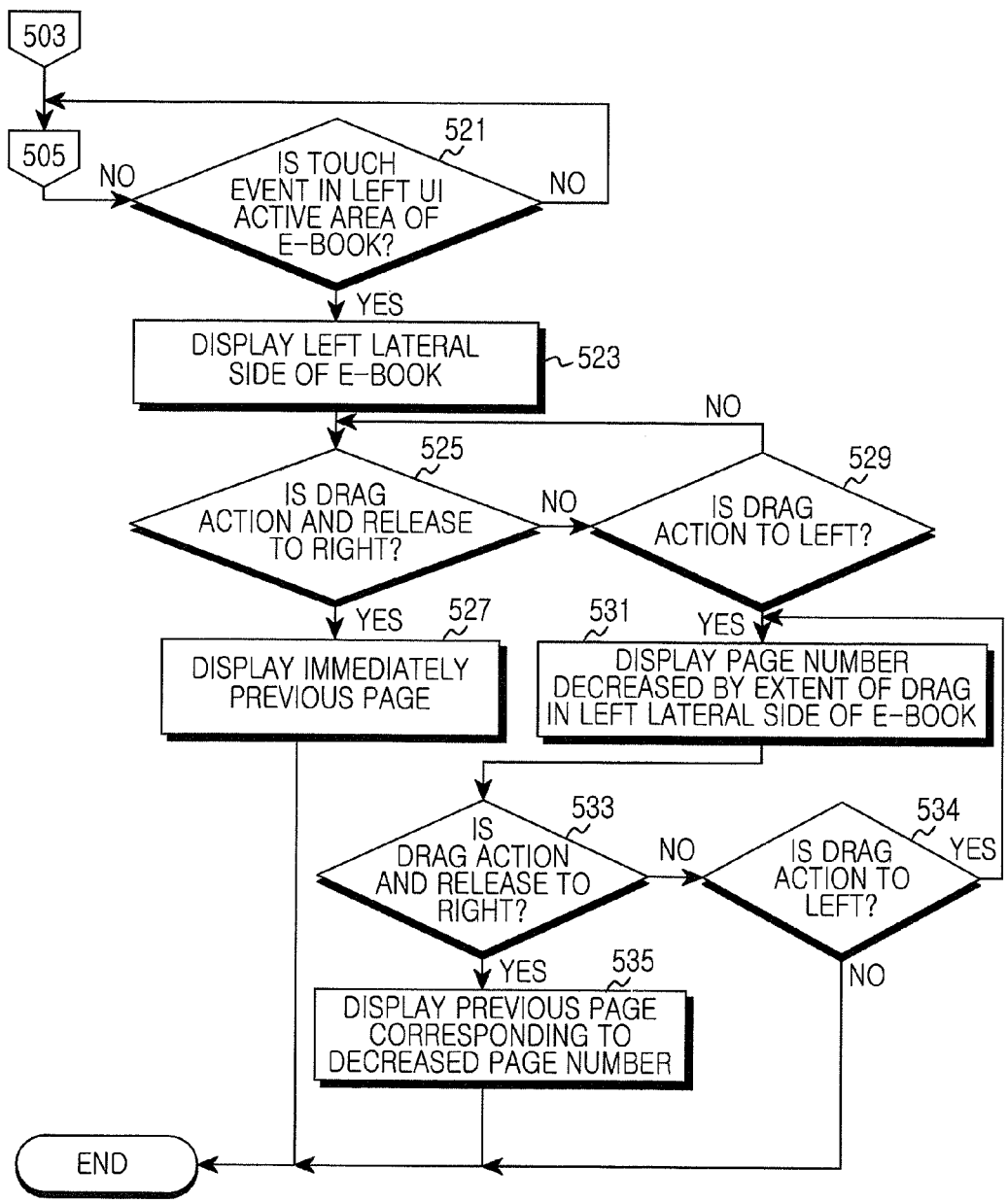

FIGS. 5A and 5B illustrate a method for turning pages of an e-book on a multi-page basis in an analog fashion in a portable terminal having an e-book function according to another embodiment of the present invention. The terminal detects a request for executing the e-book function by user's key manipulation in step 501. If the request for executing the e-book function is detected in step 501, proceeding to step 503, the terminal executes the e-book function, and displays a default page of the e-book selected by the user, according to configuration information of the e-book function. For example, the configuration information of the e-book may be configured in advance so that a first page of the e-book is first displayed or the most recently displayed page of the e-book is displayed when executing the e-book function.

In step 505, the terminal determines whether a touch event is detected in the e-book. If so, proceeding to step 507, the terminal displays a right lateral side of the e-book, and the procedure proceeds to step 509.

In step 509, the terminal determines whether a leftward drag and subsequent release is detected. If so, the terminal displays an immediately next page on a screen at step 511. Otherwise, the terminal determines whether a drag is input to the right while maintaining the touch event input at step 513.

If it is determined in step 513 that a rightward drag is detected, proceeding to step 515, the terminal displays a page number increased by an extent of the rightward drag in the right lateral side of the e-book, and then the procedure proceeds to step 517. The page number displayed in the right lateral side is increased in proportion to a speed depending on the rightward drag.

In step 517, the terminal determines whether a leftward drag is detected. If so, the terminal displays a next page corresponding to the increased page number in step 519. Otherwise, the terminal determines whether the drag is continuously input to the right while maintaining the drag input in step 518.

If it is determined in step 518 that that rightward drag is continuously detected the subsequent steps are repeated, processing continues again at step 515. Otherwise, the procedure of FIG. 5 ends. For example, if the release of the touch event is detected without any drag action to the right or left, the procedure of FIG. 5 ends.

However, if it is determined in step 513 that the drag action is not input to the right while maintaining the touch event, the subsequent steps are repeated at step 509.

If it is determined in step 505 that the touch event is not detected in the right UI active area of the e-book, the terminal determines whether a touch event is detected in the left UI active area of the e-book at step 521.

If it is determined in step 521 that the touch event is detected in the left UI active area of the e-book, proceeding to step 523, the terminal displays a left lateral side of the e-book, and the procedure proceeds to step 525.

In step 525, the terminal determines whether a rightward drag action and subsequent release is detected. If so, the terminal displays a previous page in step 527. Otherwise, the terminal determines whether a leftward drag is detected at step 529.

If it is determined in step 529 that the leftward drag is detected, proceeding to step 531, the terminal displays a page number decreased by an extent of the drag in the left lateral side of the e-book, and then the procedure proceeds to step 533. The page number displayed in the left lateral side is decreased in proportion to a speed depending on the drag.

In step 533, the terminal determines whether a rightward drag and subsequent release is detected. If so, the terminal displays a previous page corresponding to the decreased page number in step 535. Otherwise, the terminal determines whether the leftward drag action is continuously detected.

If it is determined in step 534 that that drag is continuously input to the left while maintaining the drag input, returning to step 531, the subsequent steps are repeated.

Otherwise, if it is determined in step 534 that the leftward drag is not continuously detected, the procedure of FIG. 5 ends. For example, if the release of the touch event is detected without any drag action to the left or right, the procedure of FIG. 5 ends.

Meanwhile, if it is determined in step 529 that the leftward drag is not detected, the subsequent steps are repeated beginning at step 525.

If it is determined in step 521 that the touch event is not detected in the left UI active area of the e-book, the subsequent steps are repeated beginning at step 505.

Thereafter, the procedure of FIG. 5 ends.

FIG. 6 illustrates an example method for supporting a bookmark for an e-book in a portable terminal having an e-book function according to another exemplary embodiment of the present invention. The terminal performs the e-book function, displays a default page of the e-book selected by a user on a screen, and activates a bookmark function by touching a bookmark On/Off switch 601. In this case, an upper portion of the screen is provided as an upper UI active area 602. In certain embodiments, the upper UI active area 602 may be configured as default in the terminal. The bookmark On/Off switch 601 for activating/deactivating the bookmark function may be located in a left portion of the upper UI active area 602 of the e-book, and can be displayed in any suitable manner as an icon, for example, in a paper clip looking icon. In addition, a menu for automatically storing a position before moving to a bookmark page corresponding to a paper clip may be located in a right portion of the upper UI active area 602 of the e-book, and can be displayed in a suitable manner, for example, in an arrow icon.

Figures 6A, 6B:
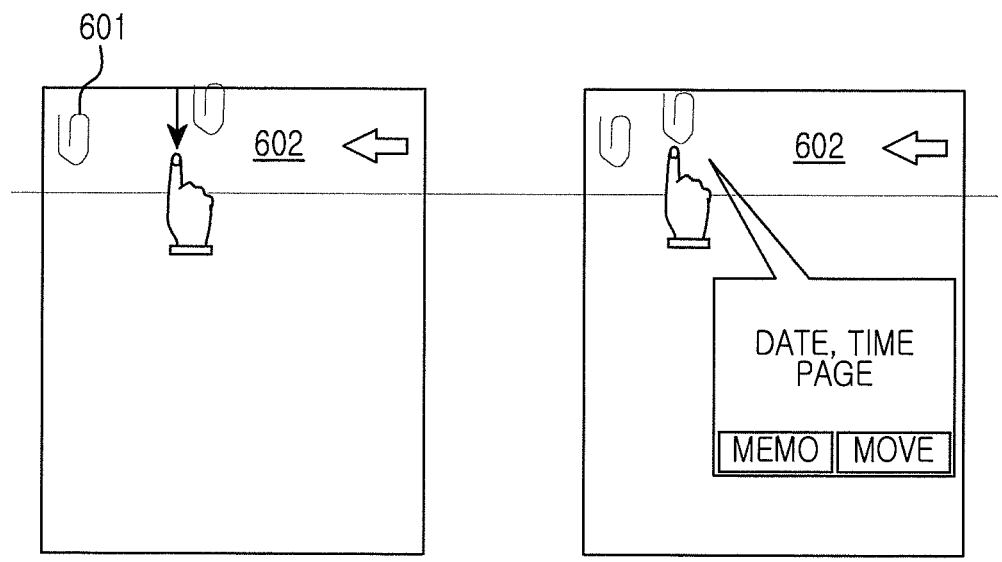
FIGS. 6A and 6B illustrate an example method for supporting a bookmark for an e-book in a portable terminal having an e-book function according to another embodiment of the present invention.

As illustrated in FIG. 6A, if a touch event is detected in the upper UI active area 602 of the e-book and a downward drag is detected, then the terminal determines that the bookmark needs to be added and generates a paper clip icon corresponding to the bookmark to be added. A location of the paper clip icon can move according to a drag direction until a release is detected. Thereafter, if the release is detected, the terminal places the generated clip icon at a location in which the release is detected. Any shape, color, or the like of the generated clip icon can be implemented. Alternatively, while placing the generated clip icon at the location in which the release is detected, an input window may be displayed via a popup window to receive information such as the shape, color, or the like of the generated clip icon from the user, and the shape, color, or the like of the generated clip icon can be modified according to the input information.

As illustrated in FIG. 6B, if a release is detected for a clip icon corresponding to the previously added bookmark, then the terminal displays a corresponding bookmark page, and upon detection of a timewise long touch for the clip icon corresponding to the previously added bookmark, the terminal determines that information on the previously added bookmark needs to be displayed, and thus displays information on a corresponding bookmark via a popup window. The long touch implies a continuous touch, for example, approximately 1 or 2 seconds, and the information on the bookmark may include information on a date of generating the bookmark, a time of generating the bookmark, a bookmark page, etc. In addition, the popup window can display not only the information on the bookmark but also a memo menu for writing a memo and a move menu for changing a location of the bookmark. In this case, when the user selects the memo menu, a memo window can be displayed to receive a content of memo for the bookmark, and when the user selects the move menu, a location change mode of the bookmark can be performed to receive the changed location of the clip corresponding to the bookmark.

Although not shown, if a touch event is detected for the clip icon for the previously added bookmark, the terminal displays a corresponding bookmark page, and if a drag action and subsequent release is detected to the left or right for the clip icon corresponding to the previously added bookmark on which the bookmark page is displayed, then the terminal determines that it is required to move the bookmark page corresponding to the previously added bookmark, and thus moves to the bookmark page.

Although not shown, if a touch event is detected for the clip icon corresponding to the previously added bookmark and a drag action and subsequent release is detected, then the terminal determines that the previously added bookmark needs to be removed, and thus deletes the clip icon corresponding to the bookmark.

Figure 7A:
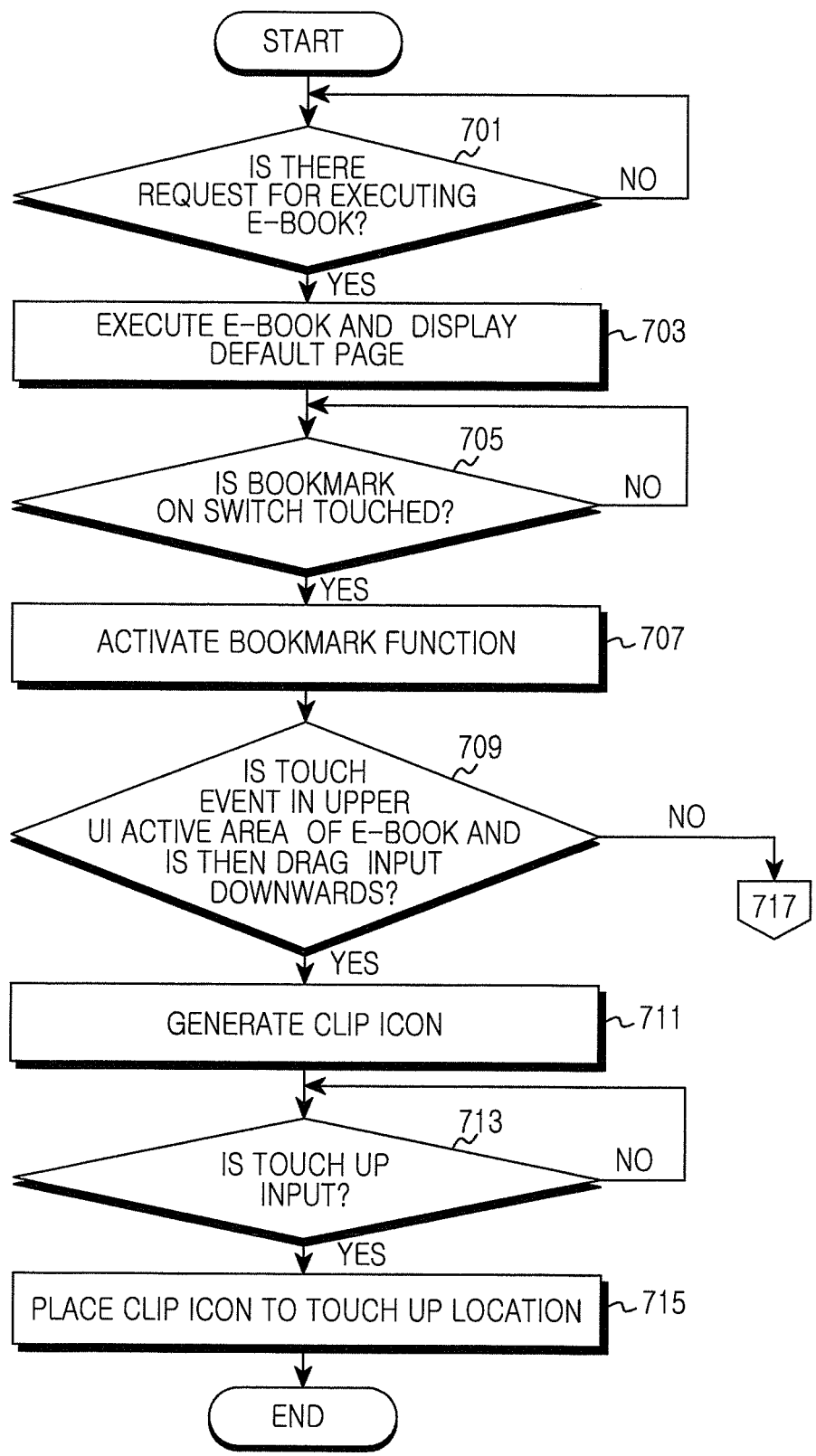
FIGS. 7A and 7B illustrate an example method for supporting a bookmark for an e-book in a portable terminal having an e-book function according to another embodiment of the present invention.
Figure 7B:
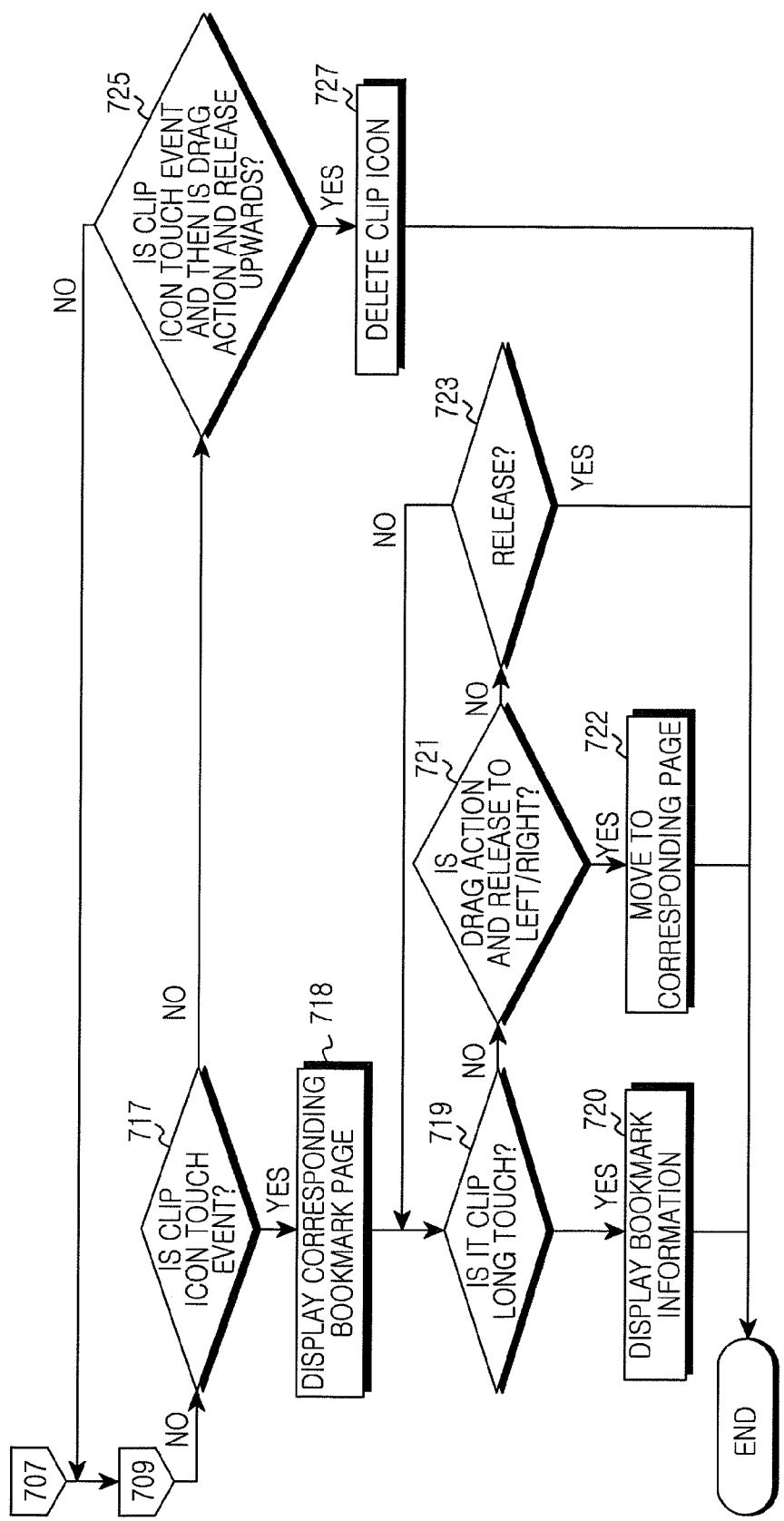

FIGS. 7A and 7B illustrate a method for supporting a bookmark for an e-book in a portable terminal having an e-book function according to another embodiment of the present invention. The terminal detects a request for executing the e-book function by user's key manipulation in step 701. If the request for executing the e-book function is detected in step 701, the terminal executes the e-book function, and displays a pre-set page of the e-book selected by the user, according to configuration information of the e-book function at step 703. For example, the configuration information of the e-book may be configured in advance so that a first page of the e-book is first displayed or the most recently displayed page of the e-book is displayed when executing the e-book function.

In step 705, the terminal determines whether a bookmark On/Off switch is touched; that is, whether a release is detected following a touch event. The bookmark On/Off switch can be located, for example, in a left portion of an upper UI active area of the e-book, and may be displayed as a clip icon. According to another embodiment, the bookmark On/Off switch can be implemented as one switch for performing both a function of the bookmark On switch and a function of a bookmark Off switch. In this case, when the switch is touched in the bookmark Off state, a state transition occurs to the bookmark On state to activate the bookmark function, and when the switch is touched in the bookmark On state, a state transition occurs to the bookmark Off state to inactivate the bookmark function. If it is detected in step 705 that the bookmark On/Off switch is touched, proceeding to step 707, the terminal activates the bookmark function, and then the procedure proceeds to step 709.

In step 709, the terminal determines whether a touch event is detected in the pre-set upper UI active area of the e-book and a drag is input downwards while maintaining the touch down input. If so, proceeding to step 711, then the terminal generates a clip icon corresponding to a bookmark to be added, and the procedure proceeds to step 713. A location of the clip icon can move according to a drag direction until a release is detected.

In step 713, the terminal determines whether a release is detected. If so the terminal places the generated clip icon at a location at which the release is detected, and then the procedure of FIG. 7 ends. A shape, color, or the like of the generated clip icon can be implemented in any suitable manner. Alternatively, while placing the generated clip icon at the location in which the release is detected, an input window may be displayed via a popup window to receive information such as the shape, color, or the like of the generated clip icon from the user, and the shape, color, or the like of the generated clip icon can be modified according to the inputted information.

Meanwhile, if it is determined in step 709 that the touch event is not detected in the upper UI active area of the e-book and the downward drag action is not detected the terminal determines whether a release is detected for a clip icon corresponding to a previously added bookmark at step 717.

If it is determined in step 717 that the touch event is detected for the clip icon corresponding to the previously added bookmark, proceeding to step 718, the terminal displays a corresponding bookmark page, and the procedure proceeds to step 719.

In step 719, the terminal determines whether a long timewise touch is detected for the clip icon corresponding to the previously added bookmark on which the bookmark page is indicated. The long touch implies a relatively long continuous touch, for example, approximately 1 or 2 seconds. If so, the terminal determines that it is required to display information on the previously added bookmark on which the bookmark page is indicated. Proceeding to step 720, the terminal displays the information on the bookmark via a popup window, and then the procedure of FIG. 7 ends.

The information on the bookmark may include information on a date of generating the bookmark, a time of generating the bookmark, a bookmark page, etc. In addition, the popup window can display not only the information on the bookmark but also a memo menu for writing a memo and a move menu for changing a location of the bookmark. In this case, when the user selects the memo menu, a memo window can be displayed to receive a content of memo for the bookmark, and when the user selects the move menu, a location change mode of the bookmark can be performed to receive the changed location of the clip icon corresponding to the bookmark.

Otherwise, if it is determined in step 719 that the long timewise touch is not detected for the clip icon corresponding to the previously added bookmark on which the bookmark page is indicated, the terminal determines whether a drag and touch up is input to the left/right while maintaining the touch event input at step 721. Otherwise, if it is determined in step 721 that the left/right drag action and subsequent release is detected, the terminal moves to a bookmark page corresponding to the previously added bookmark on which the bookmark page is indicated, and proceeding to step 722, moves to a corresponding bookmark page, and then the procedure of FIG. 7 ends.

Otherwise, if it is determined in step 721 that the left/right drag action and subsequent release is not detected, the terminal determines whether a release is detected at step 723.

If it is determined in step 723 that the release is detected, the procedure of FIG. 7 ends. Otherwise, the subsequent steps are repeated beginning at step 719.

Meanwhile, if it is determined in step 717 that the touch event is not detected for the clip icon corresponding to the previously added bookmark, the terminal determines whether a touch event is detected for the clip icon corresponding to the previously added bookmark and an upward drag action and subsequent release (e.g., up to the end of the upper direction).

If it is determined in step 725 that the touch event is detected for the clip icon corresponding to the previously added bookmark and the upward drag action and subsequent release, the terminal removes the previously added bookmark. In step 727, the terminal deletes the clip icon corresponding to the bookmark, and then the procedure of FIG. 7 ends.

Otherwise, if it is determined in step 725 that the touch event is not detected for the clip icon corresponding to the previously added bookmark and the upward drag and subsequent release, the subsequent steps are repeated beginning at step 709. Thereafter, the procedure of FIG. 7 ends.

FIG. 8 illustrates an example method for tuning pages of an e-book in an analog fashion by using a 3-axis sensor in a portable terminal having an e-book function according to another embodiment of the present invention. The terminal executes the e-book function and displays a default page of the e-book selected by a user on a screen. In this case, a right portion of the screen is provided as a right UI active area 801, and a left portion of the screen is provided as a left UI active area 802. The right UI active area 801 and the left UI active area 802 may be implemented as default in the terminal.

Figure 8A:
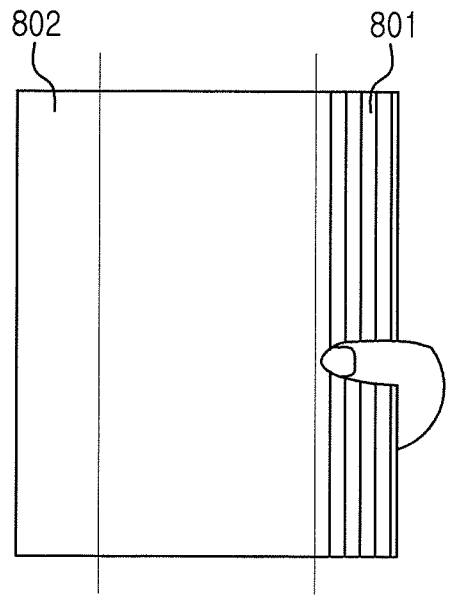
FIGS. 8A through 8C illustrate an example method for tuning pages of an e-book in an analog fashion by using a 3-axis sensor in a portable terminal having an e-book function according to another embodiment of the present invention.
Figure 8B:
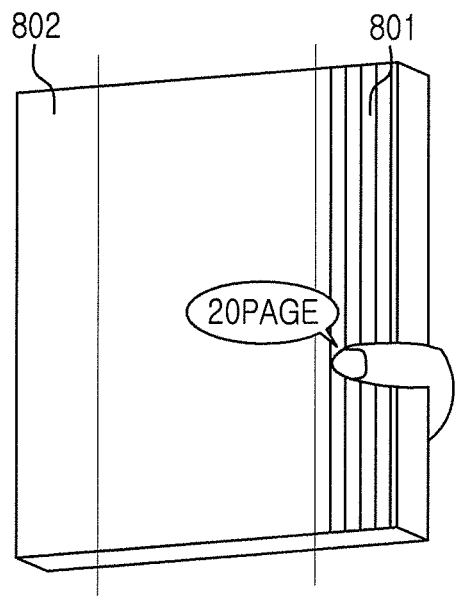
Figure 8C:
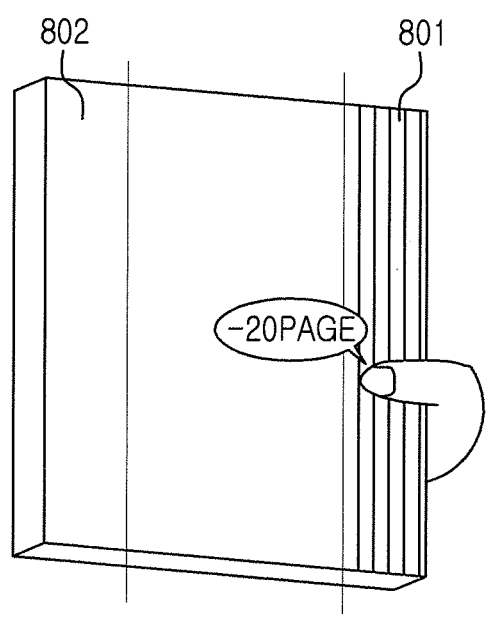

If a touch event is detected in the right UI active area 801 of the e-book, as illustrated in FIG. 8A, the terminal displays a right lateral side of the e-book and receives an inclination value representing an inclination of the terminal from a 3-axis sensor. In this case, as illustrated in FIG. 8B, upon detection of an inclination value greater than or equal to a threshold in a left direction, the terminal displays a next page to the screen on a single-page basis at a speed in proportion to the inclination value detected in the process of detecting the inclination greater than or equal to the threshold in the left direction. In this case, the terminal can display a User Interface (UI) for turning a page forward on the single-page basis to the screen. When a rightward drag action and subsequent release is detected, the terminal receives the inclination value, and upon detection of the inclination value greater than or equal to the threshold in the left direction, the terminal displays a next page corresponding to a page number increased by an extent of the drag to the screen. In this case, the terminal can display a UI for turning a page forward on a multi-page basis to the screen. As illustrated in FIG. 8C, upon detection of an inclination value greater than or equal to the threshold in a right direction, the terminal displays a previous page to the screen on the single-page basis at a speed in proportion to the inclination value detected in the process of detecting the inclination greater than or equal to the threshold in the right direction. In this case, the terminal can display a UI for turning a page back on the single-page basis to the screen.

Although not shown, on the contrary, if a touch event is detected in the left UI active area 802 of the e-book, the terminal displays a left lateral side of the e-book and receives the inclination value from the 3-axis sensor. In this case, upon detection of the inclination value greater than or equal to the threshold in the right direction, the terminal displays a previous page to the screen on the single-page basis at a speed in proportion to the inclination value detected in the process of detecting the inclination greater than or equal to the threshold in the right direction. In this case, the terminal can display a UI for turning a page back on the single-page basis to the screen. When a leftward drag action and subsequent release, the terminal receives the inclination value, and upon detection of the inclination value greater than or equal to the threshold in the right direction, the terminal displays a page number decreased by an extent of the drag to the screen. In this case, the terminal can display a UI for turning a page back on the multi-page basis to the screen. When the left lateral side of the e-book is displayed and the inclination value is received, upon detection of the inclination value greater than or equal to the threshold in the left direction, the terminal displays a next page to the screen on the single-page basis at a speed in proportion to the inclination value detected in the process of detecting the inclination greater than or equal to the threshold in the left direction. In this case, the terminal can display a UI for turning a page forward on the single-page basis to the screen.

In a state where the terminal receives the inclination value to display a UI for turning a page forward (or back) on the single-page basis on the screen, upon detection of the inclination value representing the opposite direction, the terminal can display a UI for turning a page back (or forward) on the single-page basis to the screen.

Figure 9A:
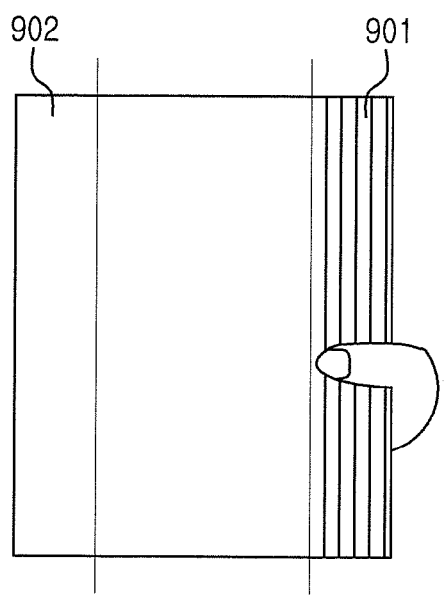
FIGS. 9A and 9B illustrate an example method for tuning pages of an e-book in an analog fashion by using a 3-axis sensor in a portable terminal having an e-book function according to another embodiment of the present invention.
Figure 9B:
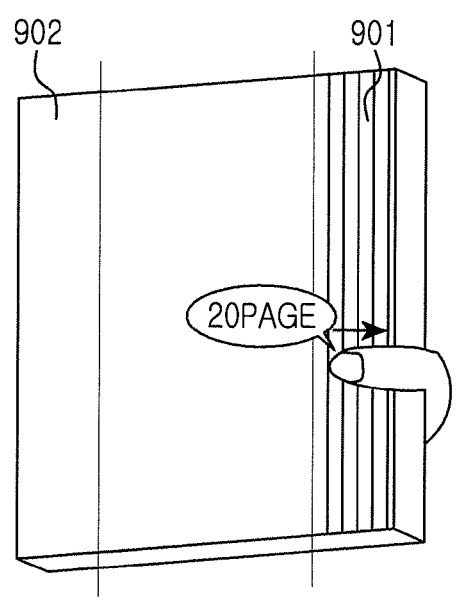

FIGS. 9A and 9B illustrate an example method for tuning pages of an e-book in an analog fashion by using a 3-axis sensor in a portable terminal having an e-book function according to another embodiment of the present invention. If a touch event is detected in a right UI active area 901 as illustrated in FIG. 9A, then the terminal displays a right lateral side of the e-book. In this case, as illustrated in FIG. 9B, when a rightward drag action and subsequent release is detected, the terminal displays a page number increased by an extent of the drag to the right lateral side of the e-book, and receives the inclination value of the terminal. Upon receipt of an inclination value greater than or equal to a threshold in a left direction, the terminal displays a next page corresponding to the increased page number to the screen. In this case, the terminal can display a UI for tuning a page forward on a multi-page basis to the screen.

Although not shown, on the contrary, if a release is detected in a left UI active area 902, the terminal displays a left lateral side of the e-book. In this case, when a leftward drag action and subsequent release is detected, the terminal displays a page number decreased by an extent of the drag to the left lateral side of the e-book, and receives the inclination value from the 3-axis sensor. Upon detection of the inclination value greater than or equal to the threshold in a right direction, the terminal displays a previous page corresponding to the decreased page number to the screen. In this case, the terminal can display a UI for tuning a page back on the multi-page basis to the screen.

Figure 10A:
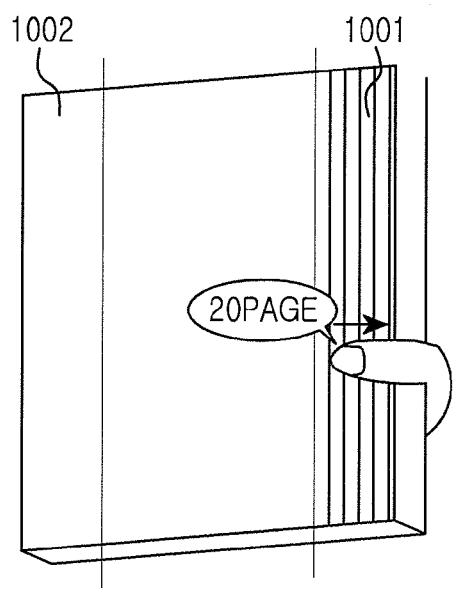
FIGS. 10A and 10B illustrate an example method for tuning pages of an e-book in an analog fashion by using a 3-axis sensor in a portable terminal having an e-book function according to another embodiment of the present invention.
Figure 10B:
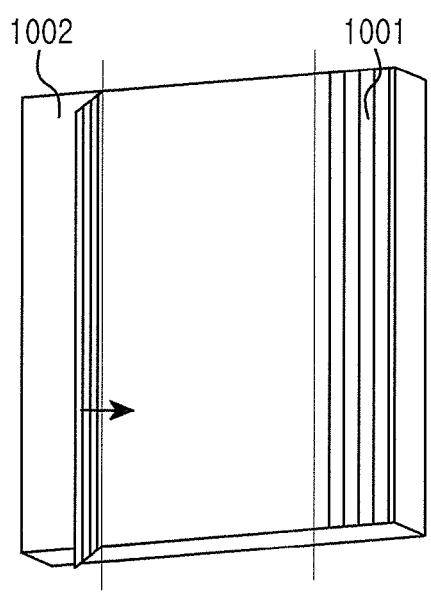

FIGS. 10A and 10B illustrate an example method for tuning pages of an e-book in an analog fashion by using a 3-axis sensor in a portable terminal having an e-book function according to another embodiment of the present invention. The terminal displays a UI for turning a page forward on a multi-page basis to a screen as illustrated in FIG. 10A, and also displays a left lateral side where pages are being turned in a part of a left UI active area. In this case, if a touch event is detected in the part of the left UI active area 1002 and a rightward drag action and subsequent release is detected, then the terminal can cancel the turning of several pages forward and can return to a page that is displayed before turning the several pages forward.

Although not shown, on the contrary, the terminal displays a UI for turning a page back on the multi-page basis to the screen, and also displays a right lateral side where pages are being turned in a part of a right UI active area. In this case, if a touch event is detected in the part of the right UI active area 1001 and a leftward drag action and subsequent release is detected, then the terminal can cancel the turning of several pages back and can return to a page that is displayed before turning the several pages back.

Figure 11A:
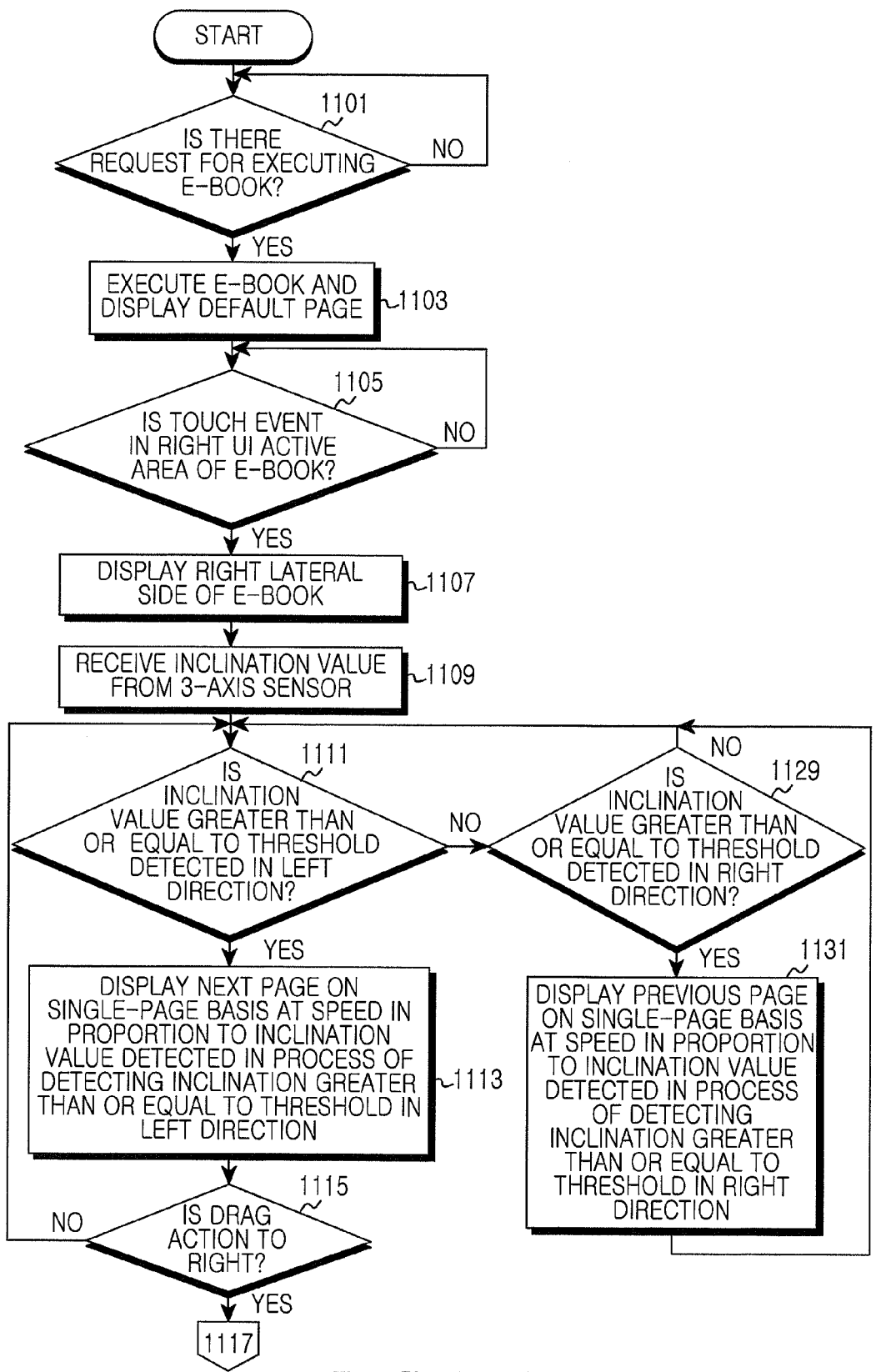
FIGS. 11A and 11B illustrate an example method for tuning pages of an e-book in an analog fashion by using a 3-axis sensor in a portable terminal having an e-book function according to another embodiment of the present invention.
Figure 11B:
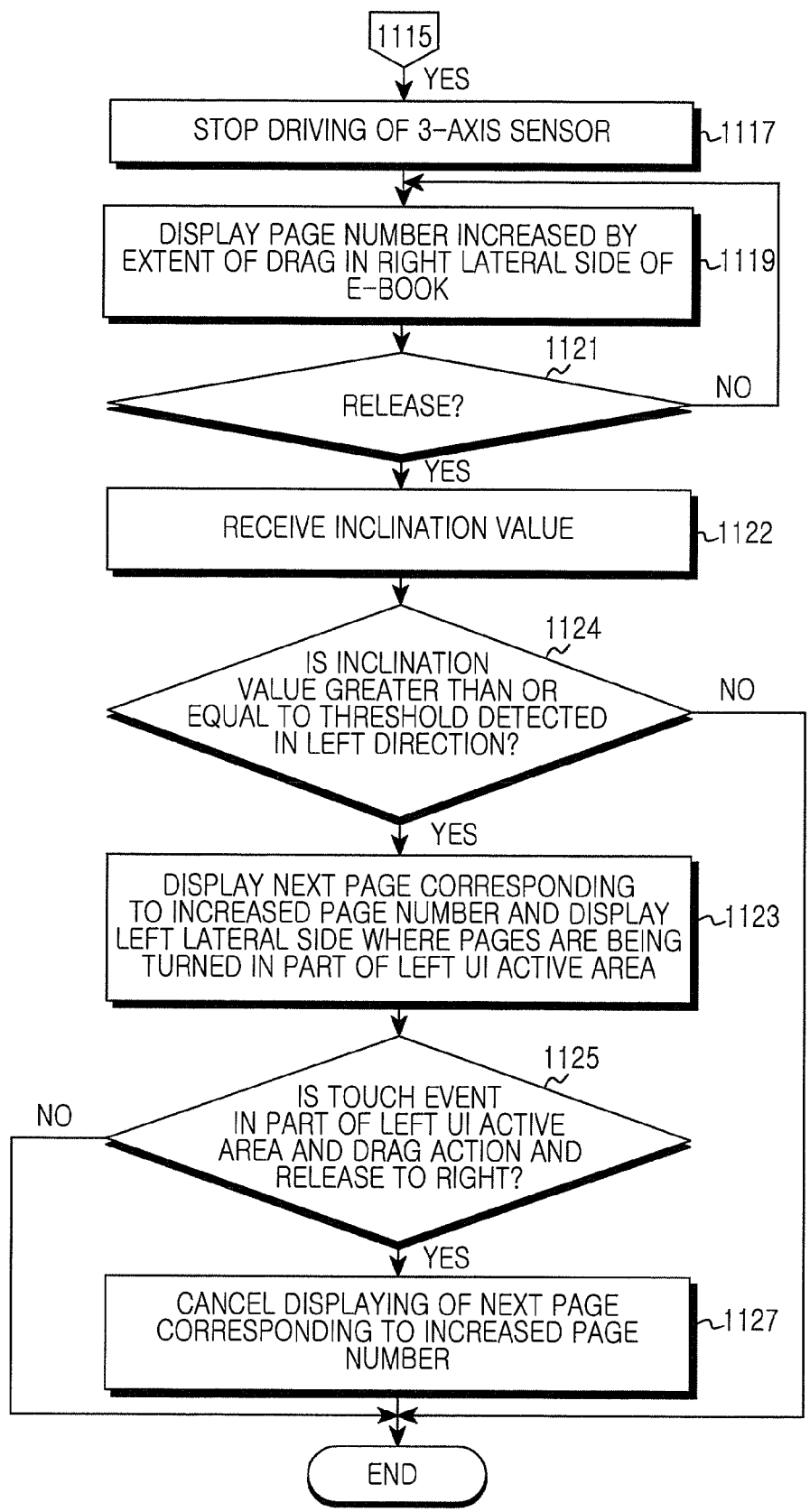

FIGS. 11A and 11B illustrate an example method for tuning pages of an e-book in an analog fashion by using a 3-axis sensor in a portable terminal having an e-book function according to another embodiment of the present invention. The example of FIGS. 11A and 11B may describe a case where a right lateral side is displayed upon touching a right UI active area of the e-book.

Referring to FIGS. 11A and 11B, the terminal detects a request for executing the e-book function by user's key manipulation in step 1101. If so, the terminal executes the e-book function, and displays a pre-set page of the e-book selected by the user, according to configuration information of the e-book function in step 1103. For example, the configuration information of the e-book may be configured in advance so that a first page of the e-book is first displayed or the most recently displayed page of the e-book is displayed when executing the e-book function.

In step 1105, the terminal determines whether a touch event is detected in a right UI active area of the e-book. If so, the terminal displays the right lateral side of the e-book in step 1107.

In step 1109, the terminal receives the inclination value associated with an inclination of the terminal. In step 1111, the terminal determines whether an inclination value greater than or equal to a threshold is detected in a left direction. If so, the terminal displays a next page to a screen on a single-page basis at a speed in proportion to the inclination value detected in the process of detecting the inclination greater than or equal to the threshold in the left direction in step 1113. For example, the greater the detected inclination value, the faster the speed of displaying the next page on the single-page basis. The terminal can display a UI for turning a page forward on the single-page basis to the screen. In this case, the terminal can report the movement of the page to the user by using voice, vibration, etc. For example, whenever a page is turned forward on the single-page basis, a sound for turning the page can be output. In addition, the terminal can display a popup window to display the number of pages which are turned forward or a current page number.

In step 1115, the terminal determines whether a rightward drag is detected. If so, the terminal stops receiving the inclination value in step 1117. In step 1119, the terminal displays a page number increased by an extent of the drag to the right lateral side of the e-book. In this case, the terminal stops the displaying of the UI for turning the page forward on the single-page basis, and displays a UI for holding a page.

In step 1121, the terminal determines whether a release is detected. If so, the terminal receives the inclination value in step 1122. In step 1124, the terminal determines whether the inclination value greater than or equal to the threshold is detected in the left direction.

If it is determined in step 1124 that the inclination value greater than or equal to the threshold is not detected in the left direction, the procedure of FIG. 11 ends. Otherwise, if it is determined in step 1124 that the inclination value greater than or equal to the threshold is detected in the left direction, the terminal displays a next page corresponding to the increased page number to the screen, and displays a left lateral side where pages are being turned in a part of a left UI active area in step 1123. In this case, the terminal displays a UI for turning several pages forward to the screen at a slower speed than the UI for turning the pages forward on the single-page basis.

In step 1125, the terminal determines whether a touch event is detected in the left UI active area and a rightward drag action and subsequent release is detected. If so, the terminal cancels the displaying of the next page corresponding to the increased page number, and returns to a previous page displayed before turning several pages forward in step 1127. Otherwise, the procedure of FIG. 11 ends.

Meanwhile, if it is determined in step 1121 that the release is not detected, the subsequent steps are repeated in step 1119.

If it is determined in step 1115 that the rightward drag is not detected, the subsequent steps are repeated beginning at step 1111.

If it is determined in step 1111 that the inclination value is greater than or equal to the threshold is not detected in the left direction, the terminal determines whether the inclination value greater than or equal to the threshold is detected in the right direction in step 1129.

If it is determined in step 1129 that the inclination value is greater than or equal to the threshold is detected in the right direction, the terminal displays a previous page to the screen on the single-page basis at a speed in proportion to the inclination value detected in the process of detecting the inclination greater than of equal to the threshold in the right direction in step 1131. Returning to step 1111, the subsequent steps are repeated. For example, the greater the detected inclination value, the faster the speed of displaying the previous page on the single-page basis. Herein, the terminal can display a UI for turning a page back on the single-page basis to the screen. In this case, the terminal can report the movement of the page to the user by using voice, vibration, etc. For example, whenever a page is turned back on the single-page basis, a sound for turning the page can be output. In addition, the terminal can display a popup window to display the number of pages which are turned back (indicated by '-') or a current page number.

Otherwise, if it is determined in step 1129 that the inclination value greater than or equal to the threshold is not detected in the right direction, the subsequent steps are repeated beginning at step 1111.

Thereafter, the procedure of FIG. 11 ends.

Figure 12A:
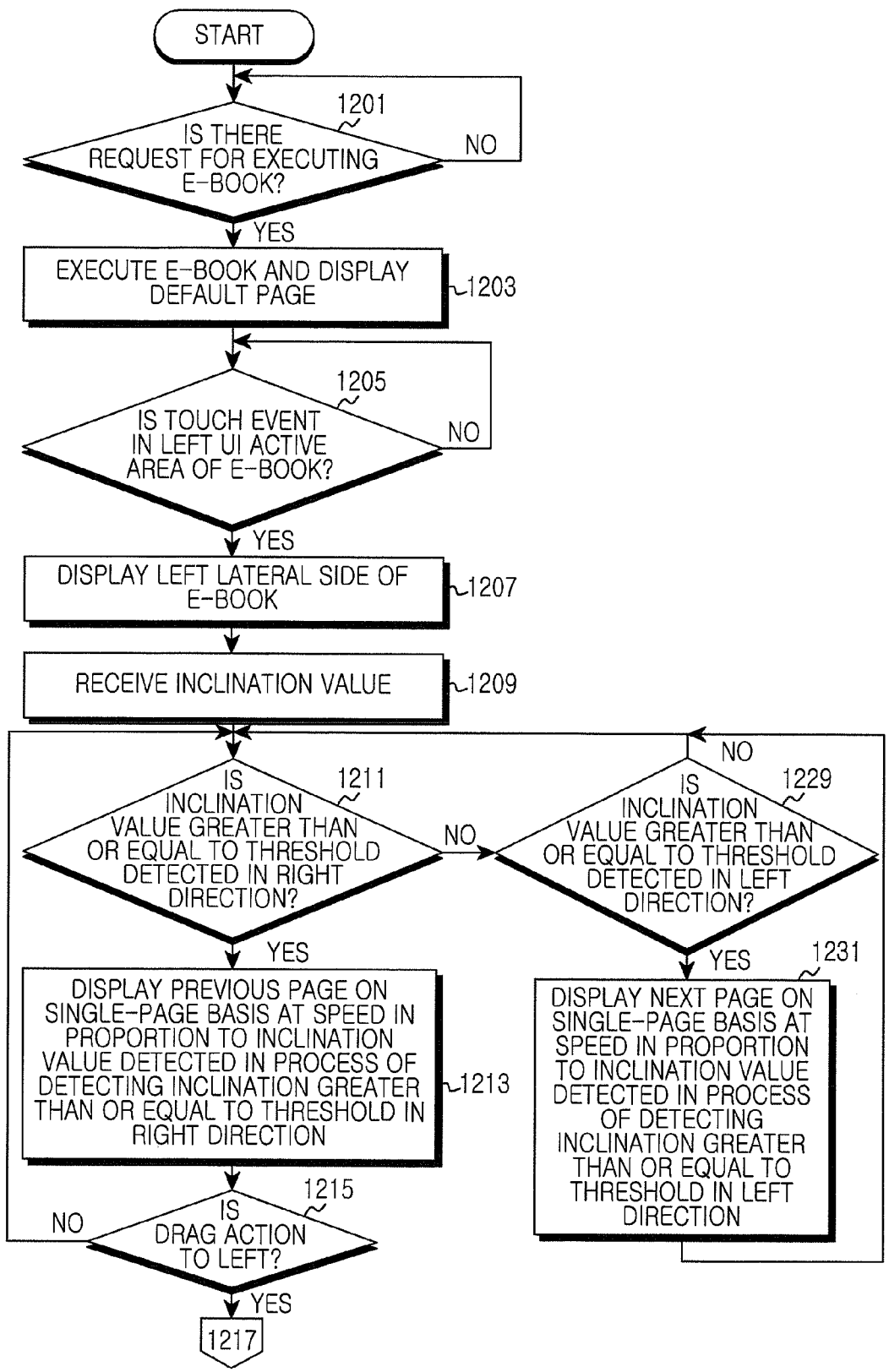
FIGS. 12A and 12B illustrate an example method for tuning pages of an e-book in an analog fashion by using a 3-axis sensor in a portable terminal having an e-book function according to another embodiment of the present invention.
Figure 12B:
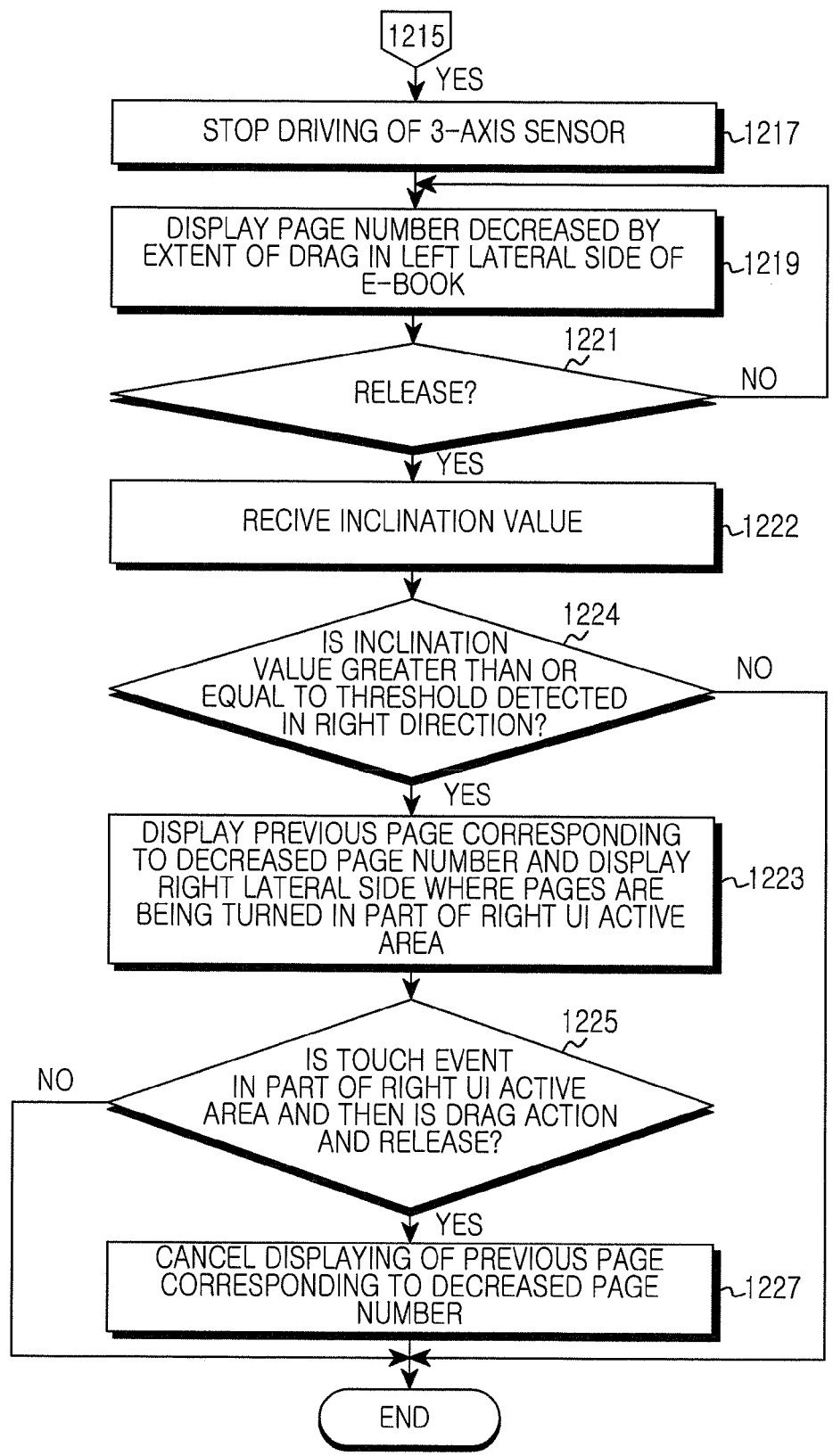

FIGS. 12A and 12B illustrate an example of a method for tuning pages of an e-book in an analog fashion by using a 3-axis sensor in a portable terminal having an e-book function according to another embodiment of the present invention. The example of FIGS. 12A and 12B may represent a case where a left lateral side is displayed upon touching a left UI active area of the e-book.

Referring to FIGS. 12A and 12B, the terminal detects a request for executing the e-book function by user's key manipulation in step 1201.

If the request for executing the e-book function is detected in step 1201, proceeding to step 1203, the terminal executes the e-book function, and displays a default page of the e-book selected by the user, according to configuration information of the e-book function. For example, the configuration information of the e-book may be configured in advance so that a first page of the e-book is first displayed or the most recently displayed page of the e-book is displayed when executing the e-book function.

In step 1205, the terminal determines whether a touch event is detected in a left UI active area of the e-book. If so, the terminal displays the left lateral side of the e-book in step 1207.

In step 1209, the terminal receives the inclination value associated with an inclination of the terminal. In step 1211, the terminal determines whether an inclination value greater than or equal to a threshold is detected in a right direction. If so, the terminal displays a previous page to the screen on a single-page basis at a speed in proportion to the inclination value detected in the process of detecting the inclination greater than of equal to the threshold in the right direction in step 1213. The terminal can display a UI for turning a page back on the single-page basis to the screen. In this case, the terminal can report the movement of the page to the user by using voice, vibration, etc. For example, whenever a page is turned back on the single-page basis, a sound for turning the page can be output. In addition, the terminal can display a popup window to display the number of pages which are turned back (indicated by '-') or a current page number.

In step 1215, the terminal determines whether a leftward drag action is detected. If so, the terminal stops receiving the inclination values at step 1217. In step 1219, the terminal displays a page number decreased by an extent of the drag to the left lateral side of the e-book. In this case, the terminal stops the displaying of the UI for turning the page back on the single-page basis, and displays a UI for holding a page.

In step 1221, the terminal determines whether a release is detected. If so, the terminal receives the inclination value associated with the inclination of the terminal in step 1122. In step 1224, the terminal determines whether the inclination value greater than or equal to the threshold is detected in the right direction. If so, the procedure of FIG. 12 ends. Otherwise, if it is determined in step 1224 that the inclination value is greater than or equal to the threshold is detected in the right direction, the terminal displays a previous page corresponding to the decreased page number to the screen, and displays a right lateral side of the turning page in a part of a right UI active area in step 1223. In this case, the terminal displays a UI for turning several pages back to the screen at a slower speed than the UI for turning the pages back on the single-page basis.

In step 1225, the terminal determines whether a touch event is detected in the right UI active area and a leftward drag action and subsequent release is detected. If so, the terminal cancels the displaying of the previous page corresponding to the decreased page number, and returns to a previous page displayed before turning several pages back in step 1227. Otherwise, the procedure of FIG. 12 ends.

Meanwhile, if it is determined in step 1221 that the release is not detected, the subsequent steps are repeated beginning at step 1219.

If it is determined in step 1215 that the leftward drag action is not detected, the subsequent steps are repeated beginning at step 1211.

If it is determined in step 1211 that the inclination value is greater than or equal to the threshold is not detected in the right direction, the terminal determines whether the inclination value is greater than or equal to the threshold is detected in the left direction beginning at step 1229.

If it is determined in step 1229 that the inclination value is greater than or equal to the threshold is detected in the left direction, the terminal displays a next page to the screen on the single-page basis at a speed in proportion to the inclination value detected in the process of detecting the inclination greater than or equal to the threshold in the left direction at step 1231. The terminal can display a UI for turning a page forward on the single-page basis to the screen. In this case, the terminal can report the movement of the page to the user by using voice, vibration, etc. For example, whenever a page is turned forward on the single-page basis, a sound for turning the page can be output. In addition, the terminal can display a popup window to display the number of pages which are turned forward or a current page number. Otherwise, if it is determined in step 1229 that the inclination value is greater than or equal to the threshold is not detected in the left direction, the subsequent steps are repeated beginning at step 1211. Thereafter, the procedure of FIG. 12 ends.

Meanwhile, although not shown, when an inclination of an opposite direction is detected in a state where a UI for turning a page forward (or back) on the single-page basis to the screen, the terminal can receive the inclination value for turning pages back (or forward) on the single-page basis to the screen. The terminal can report to the user that the page moves in a direction opposite to the previous case by using voice, vibration, etc.

Figure 13A:
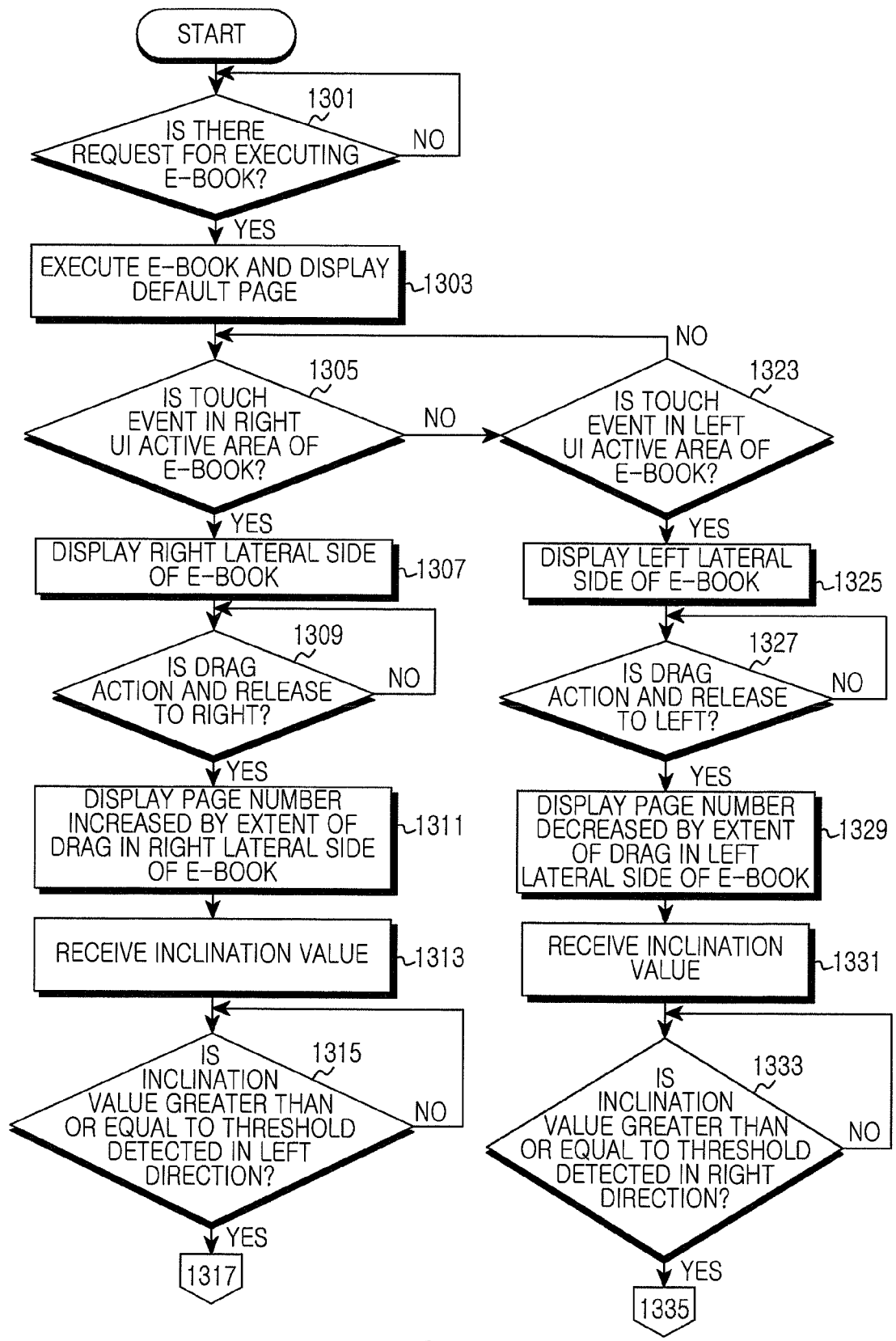
FIGS. 13A and 13B illustrate an example method for tuning pages of an e-book in an analog fashion by using a 3-axis sensor in a portable terminal having an e-book function according to another embodiment of the present invention.
Figure 13B:
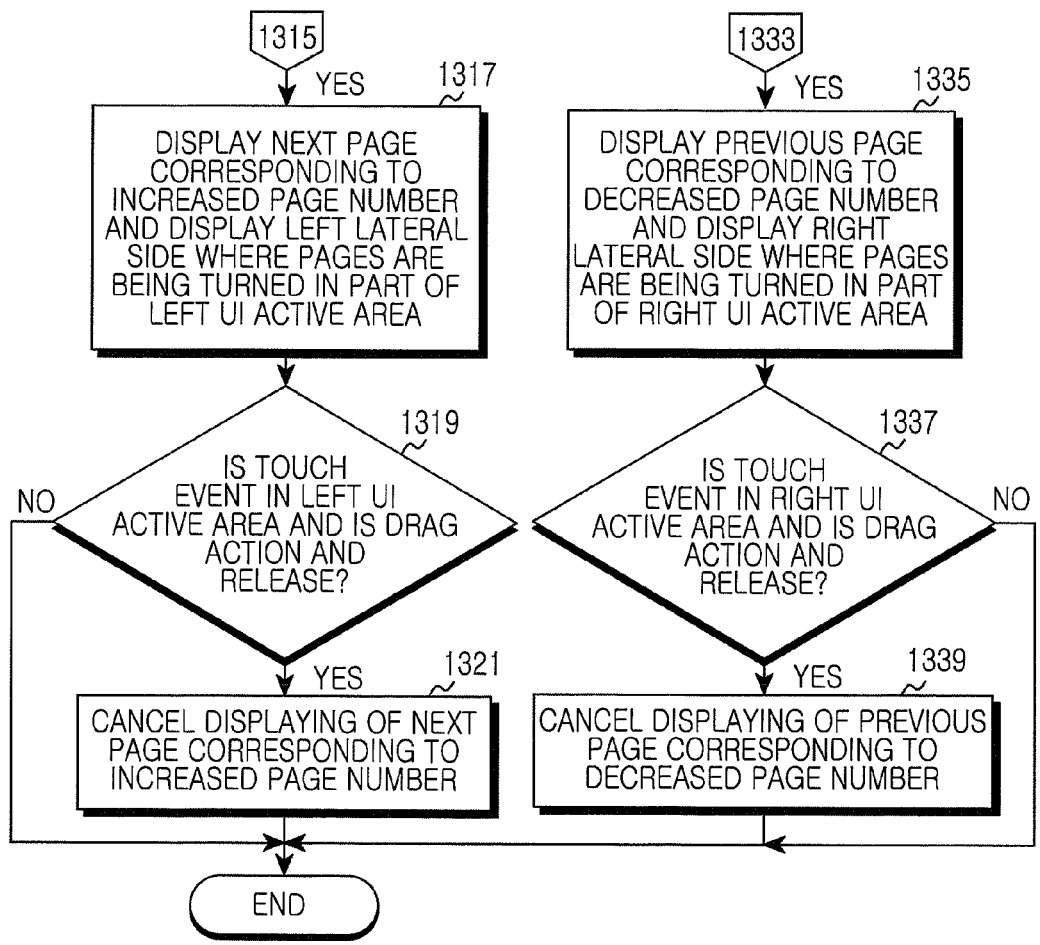

FIGS. 13A and 13B illustrate an example method for tuning pages of an e-book in an analog fashion by using a 3-axis sensor in a portable terminal having an e-book function according to another embodiment of the present invention. The terminal detects a request for executing the e-book function by user's key manipulation in step 1301. If the request for executing the e-book function is detected in step 1301, proceeding to step 1303, the terminal executes the e-book function, and displays a default page of the e-book selected by the user, according to configuration information of the e-book function. For example, the configuration information of the e-book may be configured in advance so that a first page of the e-book is first displayed or the most recently displayed page of the e-book is displayed when executing the e-book function.

In step 1305, the terminal determines whether a touch event is detected in a right UI active area of the e-book. If so, the terminal displays a right lateral side of the e-book at step 1307.

In step 1309, the terminal determines whether a rightward drag action is detected. If so, the terminal displays a page number increased by an extent of the drag to the right lateral side of the e-book at step 1311. The page number displayed in the right lateral side is increased in proportion to a speed depending on the drag.

In step 1313, the terminal receives the inclination value representing an inclination of the terminal. In step 1315, the terminal determines whether an inclination value is greater than or equal to a threshold is detected in a left direction. If so, the terminal displays a next page corresponding to the increased page number to the screen, and displays a left lateral side of the turning page in a part of a left UI active area in step 1317. In this case, the terminal displays a UI for turning several pages forward to the screen at a slower speed than the UI for turning the pages forward on the single-page basis.

In step 1319, the terminal determines whether a touch event is detected in the left UI active area and a rightward drag action and subsequent release. If so, the terminal cancels the displaying of the next page corresponding to the increased page number, and returns to a previous page displayed before turning several pages forward at step 1321. Otherwise, the procedure of FIG. 13 ends.

Meanwhile, if it is determined in step 1305 that the touch event is not detected in the right UI active area of the e-book, the terminal determines whether a touch event is detected in a pre-set left UI active area of the e-book in step 1323. If so, the terminal displays the left lateral side of the e-book at step 1325. In step 1327, the terminal determines whether a leftward drag action and subsequent release is detected. If so, the terminal displays a page number decreased by an extent of the drag in the left lateral side of the e-book at step 1329. The page number displayed in the left lateral side is decreased in proportion to a speed depending on the drag.

In step 1331, the terminal receives the inclination value representing the inclination of the terminal. In step 1333, the terminal determines whether the inclination value is greater than or equal to a threshold is detected in the right direction. If it is determined in step 1333 that the inclination value is greater than or equal to the threshold is detected in the right direction, proceeding to step 1335, the terminal displays a previous page corresponding to the decreased page number to the screen, and displays the right lateral side of the turning page in the part of the right UI active area. In this case, the terminal displays a UI for turning several pages back to the screen at a slower speed than the UI for turning the pages back on the single-page basis.

In step 1337, the terminal determines whether a touch event is detected in the right UI active area and a leftward drag action and subsequent release is detected. If so, the terminal cancels the displaying of the previous page corresponding to the decreased page number, and returns to a previous page displayed before turning several pages back at step 1339. Otherwise, the procedure of FIG. 13 ends.

Figure 14:
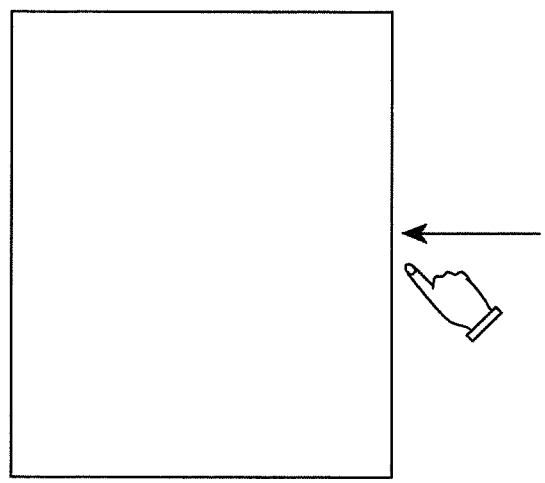
FIG. 14 illustrate an example method for turning pages of an e-book in an analog fashion by using an acceleration sensor in a portable terminal having an e-book function according to another embodiment of the present invention.

FIG. 14 illustrates an example method for turning pages of an e-book in an analog fashion by using an acceleration sensor in a portable terminal having an e-book function according to another embodiment of the present invention. Upon detection of a request for executing the e-book, the terminal executes the e-book function, displays a default page of the e-book selected by a user to a screen, and thereafter receives an acceleration value representing an acceleration of a lateral side of the terminal. If an acceleration value greater than or equal to a threshold is detected in a right lateral side as illustrated in FIG. 14, the terminal displays a next page to the screen. Although not shown, if the acceleration value greater than or equal to the threshold is detected in a left lateral side, the terminal can display a previous page to the screen.

Figure 15:
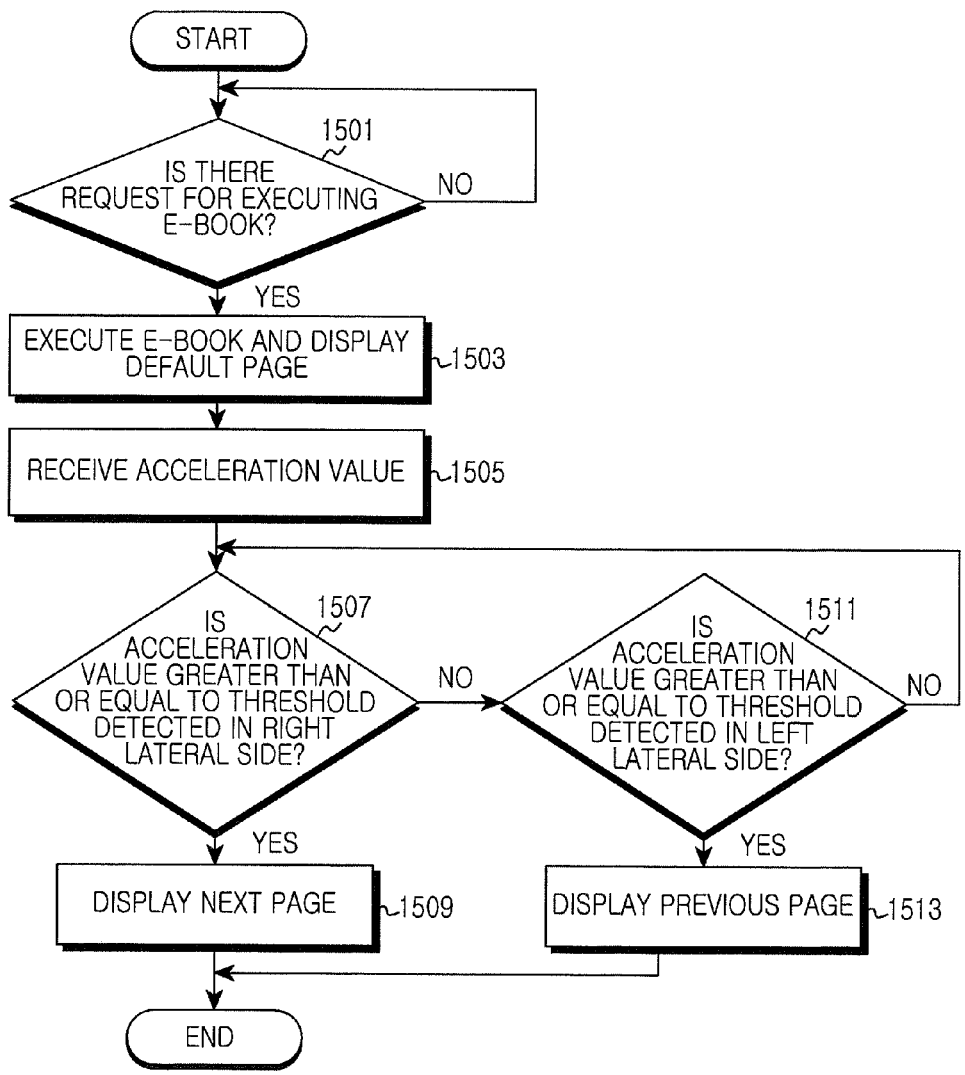
FIG. 15 illustrates an example method for turning pages of an e-book in an analog fashion by using an acceleration sensor in a portable terminal having an e-book function according to another embodiment of the present invention.

FIG. 15 illustrates a method for turning pages of an e-book in an analog fashion by using an acceleration sensor in a portable terminal having an e-book function according to another embodiment of the present invention. The terminal detects a request for executing the e-book function by user's key manipulation in step 1501. If the request for executing the e-book function is detected in step 1501, the terminal executes the e-book function, and displays a default page of the e-book selected by the user, according to configuration information of the e-book function at step 1503. For example, the configuration information of the e-book may be configured in advance so that a first page of the e-book is first displayed or the most recently displayed page of the e-book is displayed when executing the e-book function.

In step 1505, the terminal receives the acceleration value to determine an acceleration of a lateral side of the terminal. In step 1507, the terminal determines whether an acceleration value is greater than or equal to a threshold is detected in the right lateral side. If the acceleration value greater than or equal to the threshold is detected in the right lateral side in step 1507, the terminal displays a next page to the screen at step 1509. The terminal can display a UI for turning a page forward to the screen. In this case, the terminal can report the movement of the page to the user by using voice, vibration, etc. For example, whenever a page is turned forward, a sound for turning the page can be output. Otherwise, if it is determined in step 1507 that the acceleration value greater than or equal to the threshold is not detected in the right lateral side, the terminal determines whether the acceleration value greater than or equal to the threshold is detected in the left lateral side at step 1511.

If it is determined in step 1511 that the acceleration value greater than or equal to the threshold is detected in the left lateral side, the terminal displays a previous page to the screen at step 1513. The terminal can display a UI for turning pages back to the screen. In this case, the terminal can report the movement of the page to the user by using voice, vibration, etc. For example, whenever a page is turned back, a sound for turning the page can be output. Otherwise, if it is detected in step 1511 that the acceleration value greater than or equal to the threshold is not detected in the left lateral side, the subsequent steps are repeated at step 1507.

Thereafter, the procedure of FIG. 15 ends.

According to exemplary embodiments of the present invention, a User Interface (UI) for turning pages of an e-book in an analog fashion is provided in a portable terminal having an e-book function. Therefore, a user can change pages of contents in the same natural feeling as turning pages of an actual paper book.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method for turning pages of an electronic book (e-book) in a portable terminal, the method comprising:
defining a first partial region of a screen on a first side as a first user interface (UI) activation region, a second partial region of the screen on an opposing side as a second UI activation region, and a middle region of the screen between the first partial region and the second partial region, the portable terminal comprising the screen, the screen comprising a touchscreen;
displaying at least one page of the e-book on the screen;
receiving a first input having a start position, a first direction, and an end position, the first input comprising a dragged gesture on the touchscreen;
determining whether the start position of the first input is in the first UI activation region, the second UI activation region, or the middle region of the screen;
in response to determining that the start position is in the middle region of the screen:
    determining whether the first direction of the first input is towards the first UI activation region or the second UI activation region;
    in response to determining that the first direction of the first input is towards the first UI activation region, displaying a just previous page on the screen; and
    in response to determining that the first direction of the first input is towards the second UI activation region, displaying a just next page on the screen;
in response to determining that the start position of the first input is in the first UI activation region:
    displaying a right side of the e-book;
    determining whether the first direction of the first input is towards the right side of the screen; and
    in response to determining that the first direction is towards the right side of the screen:
        displaying a number of pages to be increased relative to the displayed at least one page;
        receiving a first inclination value;
        determining whether the first inclination value is greater than or equal to a threshold directed in a left direction; and
        in response to determining that the first inclination value is greater than or equal to the threshold directed in the left direction, displaying a page corresponding to the number of pages to be increased; and
in response to determining that the start position of the first input is in the second UI activation region:
    displaying a left side of the e-book;
    determining whether the first direction of the first input is towards the left side of the screen; and
    in response to determining that the first direction is towards the left side of the screen:
        displaying a number of pages to be decreased relative to the displayed at least one page;
        receiving a second inclination value;
        determining whether the second inclination value is greater than or equal to a threshold directed in a right direction; and
        in response to determining that the first inclination value is greater than or equal to the threshold directed in the right direction, displaying a page corresponding to the number of pages to be decreased.

2. The method of claim 1, wherein receiving the first inclination value comprises identifying the first inclination value when the first input is received.

3. The method of claim 1, further comprising when displaying the left side of the e-book where pages are being turned and in response to detecting a second direction of the first input that is towards the right side of the screen and subsequent release of the first input, canceling the displaying of the page corresponding to the number of pages to be increased.

4. The method of claim 1, wherein displaying the page corresponding to the number of pages to be decreased comprises displaying a previous page on a single-page basis on the screen at a speed in proportion to the second inclination value.

5. The method of claim 1, wherein receiving the second inclination value comprises identifying the inclination value when the first input is received.

6. The method of claim 1, further comprising:
when displaying the right side of the e-book where pages are being turned and in response to detecting a second direction of the first input that is towards the left side of the screen and subsequent release of the first input canceling the displaying of the page corresponding to the number of pages to be decreased.

7. The method of claim 1, wherein displaying the page corresponding to the number of pages to be increased comprises displaying a next page on a single-page basis on the screen at a speed in proportion to the first inclination value.

8. An apparatus for turning pages of an electronic book (e-book) in a portable terminal, the apparatus comprising:
a controller comprising hardware, the controller configured to:
define a first partial region of a screen on a first side as a first user interface (UI) activation region, a second partial region of the screen on an opposing side as a second UI activation region, and a middle region of the screen between the first partial region and the second partial region, the portable terminal comprising the screen, the screen comprising a touchscreen;
control to display at least one page of the e-book on the screen;
receive a first input having a start position, a first direction, and an end position, the first input comprising a dragged gesture on the touchscreen;
determine whether the start position of the first input is in the first UI activation region, the second UI activation region, or the middle region of the screen;
in response to determining that the start position is in the middle region of the screen:
determine whether the first direction of the first input is towards the first UI activation region or the second UI activation region;
in response to determining that the first direction of the first input is towards the first UI activation region, control to display a just previous page on the screen; and
in response to determining that the first direction of the first input is towards the second UI activation region, control to display a just next page on the screen;
in response to determining that the start position of the first input is in the first UI activation region:
control to display a right side of the e-book;
determine whether the first direction of the first input is towards the right side of the screen; and
in response to determining that the first direction is towards the right side of the screen:
control to display a number of pages to be increased relative to the displayed at least one page;
receive a first inclination value;
determine whether the first inclination value is greater than or equal to a threshold directed in a left direction; and
in response to determining that the first inclination value is greater than or equal to the threshold directed in the left direction, control to display a page corresponding to the number of pages to be increased; and
in response to determining that the start position of the first input is in the second UI activation region:
control to display a left side of the e-book;
determine whether the first direction of the first input is towards the left side of the screen; and
in response to determining that the first direction is towards the left side of the screen:
control to display a number of pages to be decreased relative to the displayed at least one page;
receive a second inclination value;
determine whether the second inclination value is greater than or equal to a threshold directed in a right direction; and
in response to determining that the first inclination value is greater than or equal to the threshold directed in the right direction, control to display a page corresponding to the number of pages to be decreased.

9. The apparatus of claim 8, wherein the controller is further configured to identify the first inclination value when the first input is received.

10. The apparatus of claim 8, wherein the controller is further configured to, when the left side the e-book where pages are being turned is displayed and in response to detecting a second direction of the first input that is towards the right side of the screen and subsequent release of the first input, control to cancel the display of the page corresponding to the number of pages to be increased.

11. The apparatus of claim 8, the controller is further configured to control to display a previous page on a single-page basis on the screen at a speed in proportion to the second inclination value.

12. The apparatus of claim 8, wherein the controller is further configured to control to display a next page on the screen on a single-page basis at a speed in proportion to the first inclination value.

13. The apparatus of claim 8, wherein the controller is further configured to identify the second inclination value when the first input is received.

14. The apparatus of claim 8, wherein the controller is further configured to, when the right side of the e-book where pages are being turned is displayed and in response to detecting a second direction of the first input that is towards the right side of the screen and subsequent release of the first input control to cancel the display of the page corresponding to the number of pages to be decreased.

* * * * *